(12) United States Patent
Sinha et al.

(10) Patent No.: US 11,995,520 B2
(45) Date of Patent: May 28, 2024

(54) EFFICIENTLY DETERMINING LOCAL MACHINE LEARNING MODEL FEATURE CONTRIBUTIONS

(71) Applicant: Adobe Inc., San Jose, CA (US)

(72) Inventors: Ritwik Sinha, Cupertino, CA (US); Sunny Dhamnani, Bangalore (IN); Moumita Sinha, Cupertino, CA (US)

(73) Assignee: Adobe Inc., San Jose, CA (US)

( * ) Notice: Subject to any disclaimer, the term of this patent is extended or adjusted under 35 U.S.C. 154(b) by 1051 days.

(21) Appl. No.: 16/520,645

(22) Filed: Jul. 24, 2019

(65) Prior Publication Data

US 2021/0027191 A1     Jan. 28, 2021

(51) Int. Cl.
| | |
|---|---|
| *G06N 20/00* | (2019.01) |
| *G06F 16/904* | (2019.01) |
| *G06N 5/045* | (2023.01) |
| *G06N 20/20* | (2019.01) |

(52) U.S. Cl.
CPC ........... *G06N 20/00* (2019.01); *G06F 16/904* (2019.01); *G06N 5/045* (2013.01); *G06N 20/20* (2019.01)

(58) Field of Classification Search
CPC ........ G06N 20/00; G06N 20/20; G06N 5/045; G06F 16/904
USPC .......................................................... 706/12
See application file for complete search history.

(56) References Cited

U.S. PATENT DOCUMENTS

2015/0379429 A1*   12/2015   Lee .......................... G09B 5/00
706/11

OTHER PUBLICATIONS

Palczewska, et al., "Interpreting Random Forest Classification Models Using a Feature Contribution Method", Integration of Reusable Systems, Springer, 2014 (Year: 2014).*
Qian et al., "Rationalism with a Does of Empiricism: Case-Based Reasoning for Requirements-Driven Self-Adaptation", IEEE 22nd International Requirements Engineering Conference (RE), Aug. 25-29, 2014 (Year: 2014).*
Andrew Burt; "How will the GDPR impact machine learning? Answers to the three most commonly asked questions about maintaining GDPR-compliant machine learning programs."; May 16, 2018, https://www.oreilly.com/ideas/how-will-the-gdpr-impact-machine-learning.
Hosmer Jr., David W., Stanley Lemeshow, and Rodney X. Sturdivant. Applied logistic regression. Vol. 398. John Wiley & Sons, 2013.
Leo Breiman et al.; Classification And Regression Trees [CART] © 1984 by Taylor & Francis Group, LLC. Originally published by Chapman & Hall.

(Continued)

*Primary Examiner* — Tsu-Chang Lee
(74) *Attorney, Agent, or Firm* — Keller Preece PLLC

(57) ABSTRACT

The present disclosure relates to a feature contribution system that accurately and efficiently provides the influence of features utilized in machine-learning models with respect to observed model results. In particular, the feature contribution system can utilize an observed model result, initial contribution values, and historical feature values to determine a contribution value correction factor. Further, the feature contribution system can apply the correction factor to the initial contribution values to determine correction-factor adjusted contribution values of each feature of the model with respect to the observed model result.

20 Claims, 16 Drawing Sheets

(56) References Cited

OTHER PUBLICATIONS

Lakkaraju, Himabindu, Stephen H. Bach, and Jure Leskovec. "Interpretable decision sets: A joint framework for description and prediction." Proceedings of the 22nd ACM SIGKDD international conference on knowledge discovery and data mining. ACM, 2016.
Nikaash Puri et al.; "MAGIX: Model Agnostic Globally Interpretable Explanations," Jun. 15, 2018, arXiv:1706.07160v3 [cs.AI], https://arxiv.org/pdf/1706.07160.pdf.
Breiman, Leo. "Random forests." Machine learning 45.1 (2001): 5-32.
Friedman, Jerome H. "Greedy function approximation: a gradient boosting machine." Annals of statistics (2001): 1189-1232.
Chang, Chih-Chung, and Chih-Jen Lin. "LIBSVM: a library for support vector machines." ACM transactions on intelligent systems and technology (TIST) 2.3 (2011): 27.
Goodfellow, Ian, Yoshua Bengio, and Aaron Courville. Deep learning. MIT press, 2016.
Fernández-Delgado, Manuel, et al. "Do we need hundreds of classifiers to solve real world classification problems ?." The Journal of Machine Learning Research 15.1 (2014): 3133-3181.
Andrew Fogg; "Anthony Goldbloom gives you the secret to winning Kaggle competitions"; Jan. 13, 2016; https://www.import.io/post/how-to-win-a-kaggle-competition/.
Greenwell, Brandon M. "pdp: an R Package for constructing partial dependence plots." The R Journal 9.1 (2017): 421-436.
Ribeiro, Marco Tulio, Sameer Singh, and Carlos Guestrin. "Model-agnostic interpretability of machine learning." arXiv preprint arXiv:1606.05386 (2016).
Ribeiro, Marco Tulio, Sameer Singh, and Carlos Guestrin. "Why should i trust you ?: Explaining the predictions of any classifier." Proceedings of the 22nd ACM SIGKDD international conference on knowledge discovery and data mining. ACM, 2016.
Lundberg, Scott M., and Su-In Lee. "A unified approach to interpreting model predictions." Advances in Neural Information Processing Systems. 2017.
Fatima, Shaheen S., Michael Wooldridge, and Nicholas R. Jennings. "A linear approximation method for the Shapley value." Artificial Intelligence 172.14 (2008): 1673-1699.
Staniak, Mateusz, and Przemyslaw Biecek. "Explanations of model predictions with live and breakdown packages." arXiv preprint arXiv:1804.01955 (2018).
"Intelligible, Interpretable, and Transparent Machine Learning," Downloaded Sep. 12, 2019; https://www.microsoft.com/en-us/research/project/intelligible-interpretable-and-transparent-machine-learning/.
"Trusting Ai: IBM Research is building and enabling Ai solutions people can trust," Downloaded Sep. 12, 2019; https://www.research.IBM.com/artificial-intelligence/trusted-ai/.
Chris Olah et al.; "The Building Blocks of Interpretability," Google AI Blog; Mar. 6, 2018; https://ai.googleblog.com/2018/03/the-building-blocks-of-interpretability.html.
"Machine Learning made beautifully simple for everyone," Downloaded Sep. 12, 2019; https://bigml.com/features#interpretable.

* cited by examiner

Historical Feature Database 502

| OS | Browser | Resolution | City | State | Time Zone | Day Part |
|---|---|---|---|---|---|---|
| Windows 10 | Explorer | 1920x1080 | Seattle | WA | -8 | Night |
| Windows 10 | Firefox | 1440x960 | Colombus | OH | -5 | Night |
| OSX 10.12 | Chrome | 4096x2160 | Denver | CO | -7 | Day |
| OSX 10.12 | Safari | 1600x900 | Dallas | TX | -8 | Day |
| Windows 7 | Explorer | 1920x1080 | San Jose | CA | -8 | Night |
| Linux | Opera | 1280x720 | New York | NY | -5 | Day |
| ... | ... | ... | ... | ... | ... | ... |

Historical Feature Value Set 508

| | 510 — 512 |
|---|---|
| OS | Windows 7 (x4), Windows 8 (x1), Windows 10 (x23), Linux (x3), OSX 10.10 (x1), OSX 10.11 (x3), OSX 10.12 (x20), ... |
| Browser | Edge (x5), Chrome (x20), Firefox (x10), Opera (x3), Safari (x5), Internet Explorer (x2), Netscape (x0) ... |
| Resolution | 800x480 (x2), 1280x720 (x5), 1600x900 (x3), 1440x960 (x10), 1280x1024 (x5), 1920x1080 (x22), 4096x2160 (x8), ... |
| ... | ... |

Corrected Contribution Value For The First Feature 1002a = Normalized Correlation Factor 904 − Initial Contribution Value For The First Feature 704a Corrected Contribution Value For The Second Feature 1002b = Normalized Correlation Factor 904 − Initial Contribution Value For The Second Feature 704b

• • •

Corrected Contribution Value For The pth Feature 1002p = Normalized Correlation Factor 904 − Initial Contribution Value For The pth Feature 704p

Fig. 10

EFFICIENTLY DETERMINING LOCAL MACHINE LEARNING MODEL FEATURE CONTRIBUTIONS

BACKGROUND

Recent years have witnessed a rapid proliferation in the use of machine-learning models. Indeed, advances in both hardware and software have increased the delivery of experiences provided to users based on machine-learning models. For instance, the hardware on modern computing devices (e.g., servers, desktops, laptops, tablets, and smartphones) is capable of implementing one or more machine-learning models (e.g., neural networks). Similarly, improvements in software enable a wide variety of machine-learning model types that improve the experiences of users.

With the increased use of machine-learning models has come an increased need for greater transparency regarding how machine-learning models arrive at their predictive decisions. For example, individuals and entities often demand to be informed regarding the logic involved in automated decision-making as well as the significance and the envisaged consequences of automated decision-making models. Because machine-learning models largely involve "black box" computations, many conventional systems that utilize machine-learning models cannot provide such information. Further, while some conventional systems have attempted to provide greater transparency, these conventional systems suffer from problems in relation to accuracy, flexibility, and efficiency of operation.

As an example of inaccuracies, some conventional systems have attempted to provide greater transparency by creating specific machine-learning models that are less complex (e.g., leverage frequent itemset mining). However, by reducing model complexity, these models suffer from lower prediction accuracies. As another example of inaccuracies, other conventional systems are ill-suited to handle various data types and must crudely convert input features to overly simplified numeric values, which also leads to inaccurate model results. Overall, many conventional systems have failed to provide model transparency without sacrificing model accuracy.

Moreover, conventional systems have significant shortfalls in relation to flexibility of operation. For instance, many conventional systems are model type specific. For example, while these conventional systems provide transparency for a single machine-learning model or model type, they cannot be generalized to other models and/or model types. Similarly, some conventional systems can provide limited feature contributions for numerical features (e.g., binary features), but they cannot provide feature contributions for other feature types (e.g., continuous or categorical features). Indeed, these conventional systems are too rigid to accommodate machine-learning models that include non-numeric feature inputs.

Furthermore, conventional systems are inefficient and unable to scale to meet increasing demand. For instance, while some conventional systems are designed to handle categorical features utilize cooperative game theoretic approaches such as Shapley values or similar approximations to identify feature contributions in predictive models. However, these approaches are computationally expensive as they require $O(2^p)$ operations, where p represents the number of features in the model. Thus, given a large number of features combined with an increasing number of scoring tasks performed every day, this exponentially growing approach quickly becomes computationally infeasible.

These, along with additional problems and issues exist in conventional systems with respect to providing feature contribution values of a machine-learning model.

BRIEF SUMMARY

Embodiments of the present disclosure provide benefits and/or solve one or more of the foregoing or other problems in the art with systems, non-transitory computer-readable media, and methods for generating the local influence or effect of features utilized in machine-learning models to predict individual results. For instance, the disclosed systems can utilize a model agnostic framework to determine a correction factor and corrected contribution values for all types of features in a manner that efficiently scales. Further, the disclosed systems can provide results of the corrected contribution values of model features in intuitive graphics.

To illustrate, the disclosed systems can determine an individual or local observed model result based on applying a machine-learning model to a set of observed feature values for features of the model. In one or more embodiments, the disclosed systems generate initial contribution values for the features of the model based on the observed model result and combined target-feature-modified model results. Moreover, the disclosed systems can determine a correction factor for the feature contribution values based on a combined historical features model result and utilize the correction factor to generate correction-factor adjusted contribution values for each of the observed features.

While this summary refers to the disclosed systems for simplicity, the summary also applies to certain disclosed methods and non-transitory computer-readable media. The following description sets forth additional features and advantages of one or more embodiments of the disclosed systems, computer media, and methods.

BRIEF DESCRIPTION OF THE DRAWINGS

The detailed description provides one or more embodiments with additional specificity and detail through the use of the accompanying drawings, as briefly described below.

FIGS. 5A-5B illustrate block diagrams of historical feature sets in accordance with one or more embodiments.

FIG. 10 illustrate generating corrected contribution values for each of the features in accordance with one or more embodiments.

DETAILED DESCRIPTION

Figure 1:
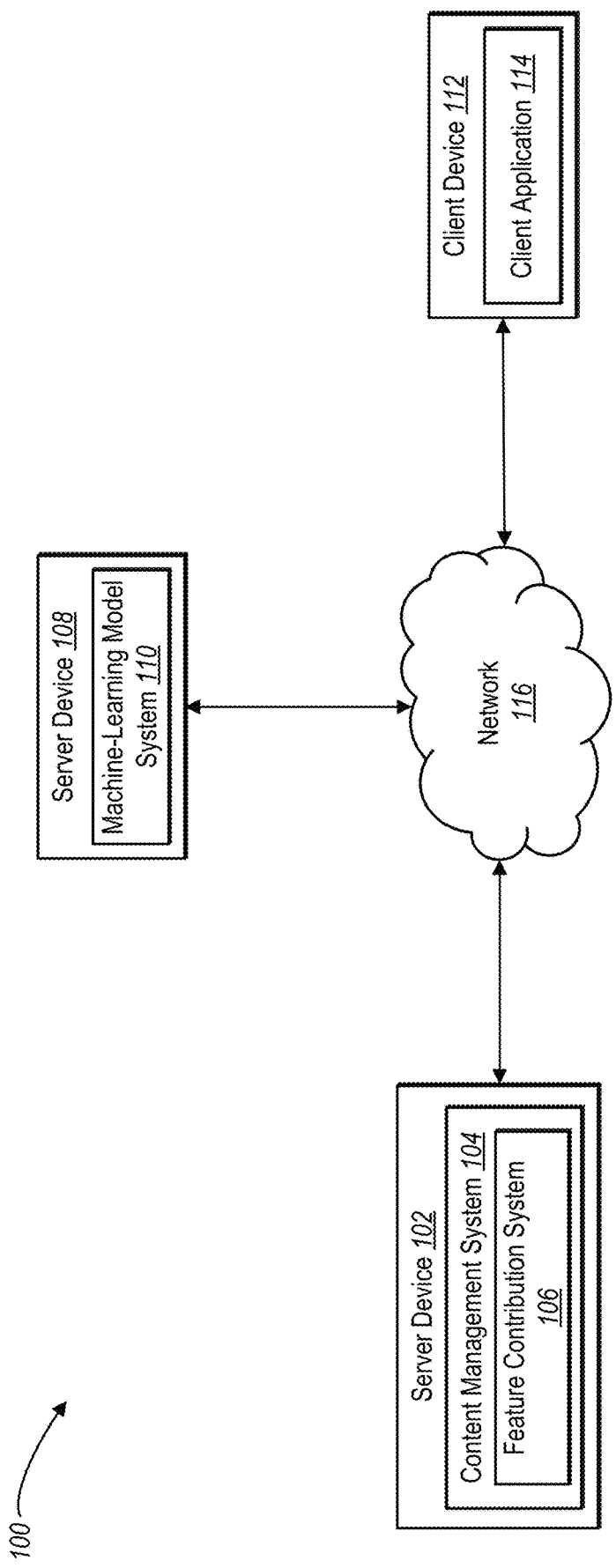
FIG. 1 illustrates a schematic diagram of an environment in which a feature contribution system can operate in accordance with one or more embodiments.

This disclosure describes one or more embodiments of a feature contribution system that accurately and efficiently determines the influence or contribution of features utilized in machine-learning models with respect to observed model results. In particular, the feature contribution system can generate and utilize an observed model result, initial contribution values, and historical feature values to determine a contribution value correction factor. Further, the feature contribution system can apply the correction factor to the initial contribution values to determine corrected contribution values of each feature of the model with respect to the observed model result.

As mentioned above, the feature contribution system can provide corrected contribution values for a local result predicted using a machine-learning model (i.e., an observed model result). For instance, a user can request explanation regarding why a particular observed model result was determined for the user using a machine-learning model (e.g., the factors that lead to the result and their impact), and in response, the feature contribution system can determine a contribution value correction factor and apply the correction factor to produce corrected contribution values of the observed feature values. Further, the feature contribution system can provide the corrected contribution values in an intuitive and comprehensible visualization.

In various embodiments, to determine the corrected contribution values for an observed model result, the feature contribution system can obtain the machine-learning model (or simply "model") used to determine the observed model result as well as the set of observed feature values provided to the model that yielded the observed model result. As described below, the model can include any type of features (i.e., model inputs), including continuous features, binary features, and categorical features.

In additional embodiments, the feature contribution system can generate modified sets of observed features that replace the feature value of each observed feature with corresponding historical feature values. For example, if a target feature has five historical feature values, the observed model result can generate five sets of target-feature-modified observed features where the target feature value is modified with one of the five historical feature values while the other observed feature values in the set of observed features remain unchanged. Further, the observed model result can apply the model to each of the modified sets of observed features and combine the results to determine a combined target-feature-modified model result for the target feature (and similarly for all of the features/historical feature values).

Moreover, in various embodiments, the feature contribution system can generate an initial contribution value corresponding to the local observed model result for each of the features. For instance, the feature contribution system can compare the observed model result to a combined target-feature-modified model result for a target feature to determine the contribution value for the target feature. Similarly, the feature contribution system can determine initial contribution values for each of the features.

As mentioned above, the feature contribution system can utilize a historical feature database that includes historical feature sets and historical feature values for features utilized in the model. In various embodiments, the feature contribution system applies the model to the historical feature values to obtain historical model results. Further, the feature contribution system can combine the historical model results to generate a combined historical features model result.

Utilizing the combined historical features model result, in various embodiments, the feature contribution system can determine a contribution value correction factor for the initial contribution values corresponding to the observed model result. More specifically, the feature contribution system can compare the observed model result and the initial contribution values to the combined historical features model result to determine a correction factor. In this manner, the correction applied to the initial contribution values reflect the difference between the combined historical features model result and the local observed model result.

Further, the feature contribution system can generate correction-factor adjusted contribution values for each of the initial contribution values based on the correction factor. For example, the feature contribution system can modify each of the initial contribution values by a ratio between the correction factor and a number of features in the features to determine the corrected contribution values (e.g., correction-factor adjusted contribution values) for the observed features.

Furthermore, in one or more embodiments, the feature contribution system can provide a visualization of the correction-factor adjusted contribution values in response to a user request. In some embodiments, the visualization can include graphs, charts, and/or other graphics that intuitively indicate the influence (e.g., contribution) of a number of features that influenced the model result predicted for the user. In some embodiments, the visualization includes positive contribution values of some features and negative contribution values of other features. Indeed, the feature contribution system can generate and provide visualizations that explain the decision of the machine-learning model in a simple, clear, and understandable manner.

As previously mentioned, the feature contribution system can provide numerous advantages, benefits, and practical applications over conventional systems. In particular, the feature contribution system provides improvements in accuracy, flexibility, and efficiency of operation. Regarding accuracy of operation, the feature contribution system can determine contribution values that reflect the contribution of each feature applied by a machine-learning model. Additionally, the feature contribution system can determine and utilize a contribution value correction factor to improve the accuracy of the contribution values and more precisely indicate the impact of each feature of the observed model result with respect to the machine-learning model.

Moreover, the feature contribution system can provide model transparency without sacrificing accuracy of the machine-learning model. Indeed, the feature contribution system can determine corrected contribution values for a local observed model result of a machine-learning model without tweaking, modifying, generalizing, or simplifying the model. In this manner, feature contribution indications regarding the operation of the model are not at the expense of model accuracy.

Additionally, the feature contribution system can provide improved flexibility over conventional systems. For instance, the feature contribution system can handle machine-learning models that utilize all types of features, including binary, continuous, and categorical features. Further, the feature contribution system can operate with machine-learning models that produce different result types, such as binary results as well as continuous results.

In addition, in one or more embodiments, the feature contribution system is model agnostic. In particular, the feature contribution system can determine contribution values for any type of black-box machine-learning model. For example, the feature contribution system functions with machine-learning models such as random forest models, deep neural network models, support vector machine models, gradient boosting machine models, decision-tree-based ensemble machine learning models (e.g., XGBoost), and other machine-learning models. Further, the feature contribution system can operate with these models without altering the model or crudely converting model input features to simple numeric values.

Furthermore, the feature contribution system can provide improved efficiency over conventional systems. For instance, in one or more embodiments the feature contribution system utilizes a linear algorithm, which significantly reduces the computational resources needed compared to processing exponential algorithms. Indeed, the feature contribution system can utilize $O(p)$ operations compared with conventional systems, which utilize $O(2^p)$ operations (where p is the number of features in a model).

In addition, by utilizing a linear algorithm, the feature contribution system can scale to handle millions of requests, even for models with hundreds of features. Moreover, the operational simplicity of the feature contribution system enables the feature contribution system to process requests on the fly. Indeed, the feature contribution system can receive a request, determine corrected contribution values, and provide a clear visualization of the corrected contribution values in real-time or near-real-time.

Additional advantages and benefits of the feature contribution system will become apparent in view of the following description. Further, as illustrated by the foregoing discussion, the present disclosure utilizes a variety of terms to describe features and advantages of the feature contribution system. For example, as used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, random forest models, deep neural network models, support vector machine models, gradient boosting machine models, decision-tree-based ensemble machine learning models (e.g., XGBoost), support vector machines, linear regression, logistic regression, or Bayesian networks. Thus, a machine-learning model makes high-level abstractions in data by generating data-driven predictions or decisions from the known input data.

As mentioned, machine-learning models can learn to predict a result (e.g., local results specific to a user) based on input features (e.g., feature values observed for a user). As used herein, the terms "machine-learning model features," "model features" or "features" refer to inputs of a machine-learning model, which the machine-learning model applies to generate a predicted result. Indeed, a machine-learning model can be trained to predict one or more results based on a set of input features (e.g., binary, continuous, or categorical features). More particularly, the machine-learning model applies feature values corresponding to the set of input features to predict a model result. Once trained, the machine-learning model can apply observed feature values, modified feature values, and/or historical feature values to arrive at different model results.

As used herein, the term "observed feature values" refers to a set of values witnessed from a user or other entity. For instance, observed feature values can include attributes and characteristics of a user or a client device associated with the user. In various embodiments, the machine-learning model can apply the observed feature values to generate an observed model result.

Similarly, the term "set of target-feature-modified observed features" refers to a set of observed feature values where a feature value for one of the features has been replaced or modified with a feature value from a substitute or alternative dataset. In particular, in one or more embodiments, the feature value for a target feature of the observed feature values in the target-feature-modified observed features is replaced with a historical feature value corresponding to the target feature. Further, while the target feature is replaced with a replacement feature value, the other feature values in the copy of the set of observed feature values remain unchanged. In some embodiments, as described below, the historical feature value can replace the feature value of the target feature with the same value.

As used herein, the term "target feature" refers to a given or selected feature in a set of features. For example, the target feature can correspond to the jth coordinate or entry of a feature vector, which includes feature value entries for each feature in the set of features. In various embodiments, the feature contribution system can iterate through each of the features in a set of features (e.g., in the feature vector), selecting each feature as the target feature.

The term "target-feature-modified model result," as used herein refers to applying a machine-learning model to a set of target-feature-modified observed features. In addition, when multiple sets of target-feature-modified observed features are generated for a target feature, the feature contribution system can apply the machine-learning model to each set of target-feature-modified observed features to generate multiple target-feature-modified model results. Further, as described below, the feature contribution system can combine the target-feature-modified model results corresponding to a target feature to generate a combined target-feature-modified model result. Accordingly, the term "combined target-feature-modified model result" refers to aggregating (and normalizing) multiple target-feature-modified model results generated from multiple target-feature-modified model results.

As used herein, the term "historical feature values" refer to feature values in a dataset of stored feature values. For instance, historical feature values include one or more previously observed feature values for a feature value in a set of feature values. In some embodiments, historical feature values include non-observed feature values (e.g., synthetic feature values) that are comparable to observed feature values (e.g., feature values not yet observed but that are likely to be observed). A machine-learning model can apply a machine-learning model to one or more historical feature values to generate a historical features model result. In a similar manner as described above, multiple historical features model results can be combined together to form a combined historical features model result and, in some embodiments, can represent the average predicted result (e.g., outcome) over the dataset of historical feature values.

The terms "feature contribution value" or "contribution value," as used herein, refer to an influence, effect, impact, or contribution of a feature of a machine-learning model with respect to an individual result of the machine-learning model. In particular, feature contribution values can be compared to each other to determine the relative impact of each feature within the machine-learning model for an observed model result. Contribution values can indicate a positive influence or a negative influence of a feature toward the machine-learning model arriving at the observed model result.

As mentioned above, contribution values can include initial contribution values and correction-factor adjusted contribution values. As used herein, the term "initial contribution value" for a target feature refers to a raw contribution value based on an observed model result and one or more target-feature-modified model results corresponding to a target feature. The term "correction-factor adjusted contribution value" (or simply "corrected contribution values") refers to contribution values that have had a correction factor applied to them.

The term "correction factor," as used herein, refers to a metric for correcting initial contribution values. In particular, a correction factor can include a metric that aligns the initial contribution values of an observed model result with expected predicted outcomes of the model based on historical feature values. In some embodiments, the correction factor is applied evenly to each of the initial contribution values to generate corrected contribution values. In various embodiments, the correction factor is applied differently (e.g., weighted) to different values of the initial contribution values.

Referring now to the figures, FIG. 1 illustrates a schematic diagram of an environment 100 in which a feature contribution system 106 can operate in accordance with one or more embodiments. As shown in FIG. 1, the environment 100 includes server devices 102, 108 and a client device 112 connected via a network 116. Additional detail regarding computing devices (e.g., the server devices 102, 108 and the client device 112) is provided below in connection with FIG. 15. Further, FIG. 15 also provides detail regarding networks, such as the illustrated network 116.

Although FIG. 1 illustrates a particular number, type, and arrangement of components within the environment 100, various additional environment configurations are possible. For example, each of the server devices 102, 108 can represent a set of connected server devices. As another example, the environment 100 can include any number of client devices. As a further example, the server devices 102, 108 may communicate directly with the server device 108, bypassing the network 116 or utilizing a separate and/or additional network.

As shown, the environment 100 includes the server device 102 implementing a content management system 104. In one or more embodiments, the content management system 104 facilitates creating, modifying, delivering, sharing, accessing, storing, and/or removing digital content. For example, the content management system 104 can provide digital content (e.g., a web page) to a user and detect feature values based on how the user interacts with the web page. In another example, the content management system 104 can deliver digital content (e.g., a feature analysis visualization) to a user based on an observed model result. In some embodiments, the content management system 104 can be located on a separate computing device than the feature contribution system 106.

Figure 2:
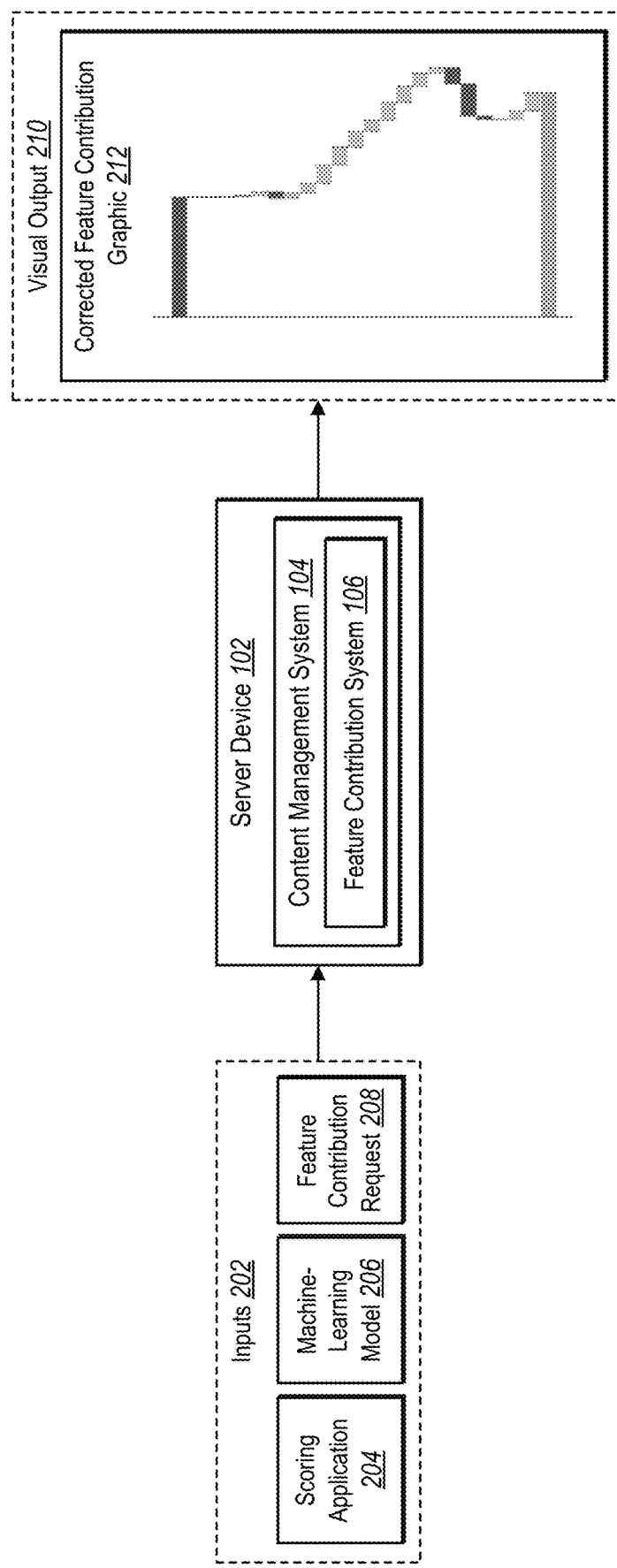
FIG. 2 illustrates an overview diagram of providing correction-factor adjusted feature contribution values within a graphical visualization in accordance with one or more embodiments.

In addition, the server device 102 includes the feature contribution system 106 shown within the content management system 104. In general, the feature contribution system 106 receives requests for feature contribution analysis corresponding to a local observed model result (e.g., a result specifically generated for the user). For example, a user can request an explanation regarding why a particular digital content item was served to them. In response, the feature contribution system 106 determines corrected contribution values for the observed model result (e.g., a contribution value applied with a correction factor). Further, the feature contribution system 106 can provide a visualization of the feature contribution analysis in response to the request. An overview of the feature contribution system 106 is provided with respect to FIG. 2.

As shown, the environment 100 also includes the server device 108 having the machine-learning model system 110. In general, the machine-learning model system 110 applies feature values (e.g., observed feature values) to a machine-learning model and generates a result (e.g., a local observed model result). The machine-learning model system 110 can correspond to a number of different types of machine-learning models. While the machine-learning model system 110 is shown apart from the content management system 104, in various embodiments, the machine-learning model system 110 is implemented within the server device 102 in connection with the content management system 104.

Additionally, the environment 100 also includes the client device 112 having a client application 114. In various embodiments, the client application 114 can be a general application (e.g., a web browser) or a tailored application (e.g., a mobile device application corresponding to the content management system 104). For example, a user associated with the client device 112 can utilize the client application 114 to access digital content provided by the content management system 104. In addition, the machine-learning model system can determine an observed model result corresponding to the user and provide, directly or via the content management system 104, one or more digital content items to the client device 112 based on the observed model result. Further, the feature contribution system 106 can determine and provide one or more correction-factor adjusted feature contribution values to the user in response to a user request, as mentioned above.

Moreover, in one or more embodiments, the client device 112 can include all, or a portion of, the feature contribution system 106. For example, the feature contribution system 106 is implemented within the client application 114 on the client device 112. In alternative embodiments, the client device 112 can download all or a portion of a software application (e.g., as part of the client application 114) corresponding to the feature contribution system 106 such that at least a portion of the operations performed by the feature contribution system 106 occur on the client device 112.

As mentioned above, FIG. 2 provides an overview diagram of providing correction-factor adjusted feature contribution values within a graphic in accordance with one or more embodiments. As shown, FIG. 2 includes the server device 102 having the content management system 104 and the feature contribution system 106. In addition, FIG. 2 includes inputs 202 to the feature contribution system 106 and a visual output 210 generated by the feature contribution system 106.

The inputs 202 include a scoring application 204, a machine-learning model 206, and a feature contribution request 208. In various embodiments, the scoring application 204 represents a consumer scoring application for which the observed model result is generated. For instance, the scoring application 204 is the framework or tool for providing digital content to a user based on an observed model result corresponding to a user. For example, the scoring application determines how to retarget a user visiting a company's website based on how likely the user is to return to the web site. In some embodiments, the scoring application 204 is part of the content management system 104.

The machine-learning model 206 can correspond to the model utilized to generate the observed model result from observed feature values. For instance, the machine-learning model 206 can include trained layers, nodes, weights, and parameters. In addition, the machine-learning model 206 can include indications of which features (i.e., input parameters) can be applied to generate model results. As described above, the machine-learning model can include a variety of different black-box machine-learning model. Moreover, the machine-learning model can accommodate a variety of input features. Additionally, in some embodiments, the machine-learning model 206 corresponds to a machine-learning model system. In alternative embodiments, the machine-learning model 206 is part of the content management system 104.

Continuing the example from above, the machine-learning model 206 can be a supervised machine-learning model (e.g., a Random Forest machine-learning model) that generates a score (e.g., a local observed model result) between 0 and 1 that indicates a user's propensity to return to the company's website. A high score (e.g., close to 1) indicates that the user will return on their own. A low score (e.g., close to 0) indicates that the user is a bot or an anonymous visitor that is not likely to return even if retargeted. A more median score (e.g., 0.2-0.6) indicates that the user is more likely to return with a reminder (e.g., a retargeted digital content item).

The feature contribution request 208 can correspond to a user (or an entity) requesting an explanation regarding why they were provided with a particular digital content item. For example, while on a third-party website, the content management system 104 provides an ad for the company (e.g., the retargeted digital content item). Upon selecting the feature contribution request option (e.g., "Why am I seeing this ad?"), the feature contribution system 106 can receive and begin to process the feature contribution request 208.

Figure 3:
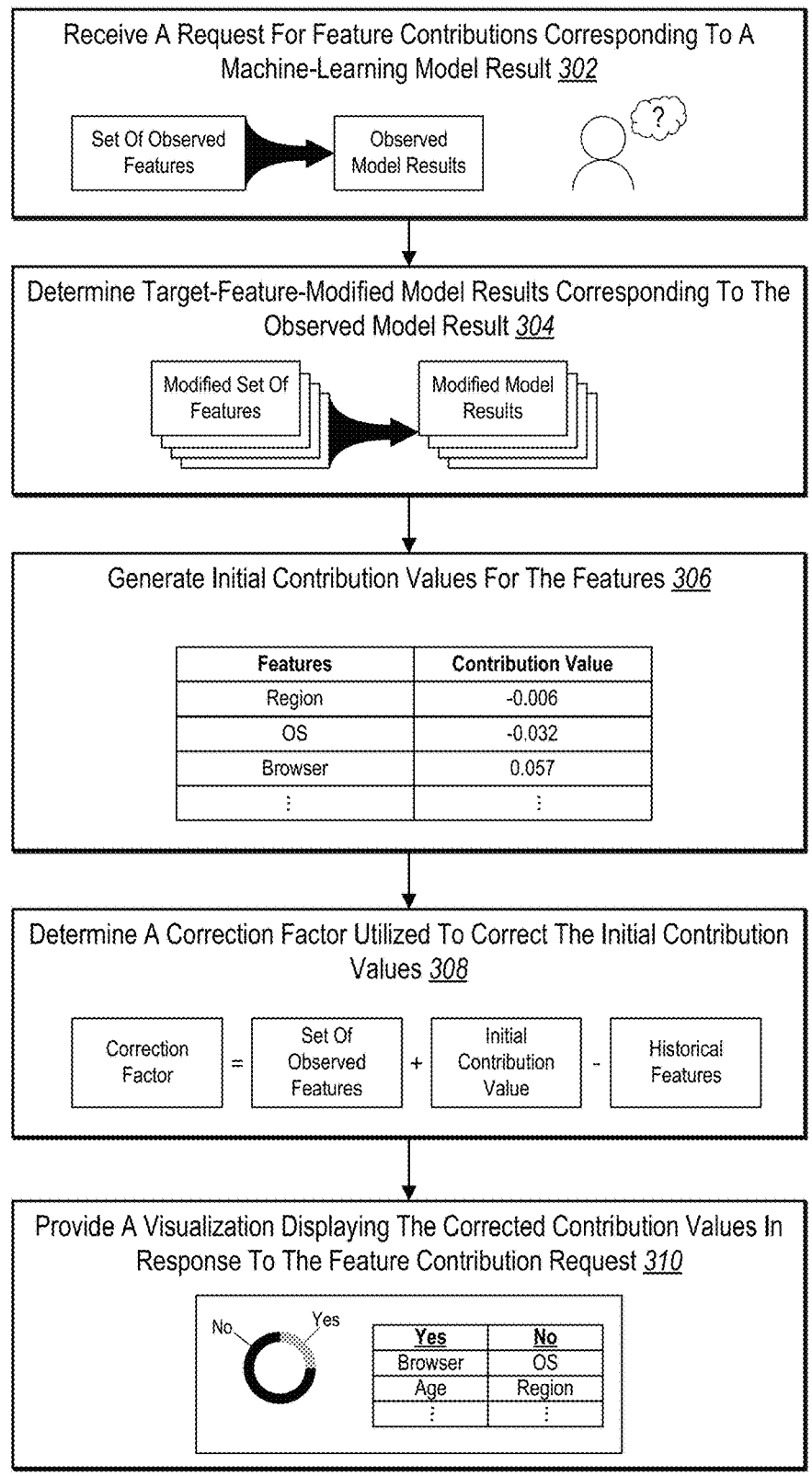
FIG. 3 illustrates an overview diagram of determining correction-factor adjusted feature contribution values in accordance with one or more embodiments.

The feature contribution system 106 can receive the inputs 202 and rapidly generate an explanation for why the user was provided with the digital content item. For example, as described with respect to FIG. 3, the feature contribution system 106 can determine the correction-factor adjusted feature contribution values of each feature applied to the machine-learning model 206 corresponding to the observed model result. Continuing the previous example, the feature contribution system 106 can determine positive contributing features and negative contributing features corresponding to the observed model result.

Further, the feature contribution system 106 can generate the visual output 210. As shown, the visual output 210 includes a corrected feature contribution graphic 212. For example, the corrected feature contribution graphic 212 includes lists, charts, and other elements that indicate the features that had the most significant influence in arriving at the observed model result. In particular, the visual output provides easy to understand graphics showing the reasons for the particular score (i.e., the local observed model result) corresponding to the user and the relative effect of each feature.

As mentioned above, FIG. 3 provides an overview diagram of a series of acts 300 for determining correction-factor adjusted feature contribution values in accordance with one or more embodiments. In one or more embodiments, the feature contribution system 106 performs the series of acts 300. In alternative embodiments, the content management system described above can perform one or more acts from the series of acts 300.

As shown, the series of acts 300 includes an act 302 of the feature contribution system 106 receiving a request for feature contributions corresponding to a machine-learning model result. In one or more embodiments, the feature contribution system 106 can detect a feature contribution request from a user in connection with a local observed model result (e.g., based on the user selecting a feature contribution request option), as described above. In some embodiments, the feature contribution system 106 receives the feature contribution request from an entity, such as server device associated with an entity, that is requesting feature contributions with respect to a particular observed model result (e.g., why an image was categorized in a particular way).

In one or more embodiments, the act 302 also includes obtaining an observed model result in connection with the received request. For example, the feature contribution system 106 identifies the observed model result, the machine-learning model that generated the observed model result, and the set of observed features (e.g., observed feature values) that the machine-learning model applied to determine the observed model result. Additional detail regarding the set of observed features and determining the observed model result is provided below in connection with FIGS. 4A-4B.

In addition, the series of acts 300 includes an act 304 of the feature contribution system 106 determining target-feature-modified model results corresponding to the observed model result. For instance, the feature contribution system 106 generates sets of target-feature-modified observed features and determines a target-feature-modified model result for each of the generated sets. In various embodiments, the feature contribution system 106 can combine the target-feature-modified model results on a per-feature basis (e.g., for each target feature). Additional detail regarding generating target-feature-modified model results for a target feature is provided below in connection with FIGS. 6A-6C.

As shown, the series of acts 300 includes an act 306 of the feature contribution system 106 generating initial contribution value for the features. In one or more embodiments, the feature contribution system 106 determines initial contribution values for each of the features utilized in the machine-learning model. For example, the feature contribution system 106 compares the observed model result with the target-feature-modified model results to determine the initial contribution values. Additional detail regarding generating initial contribution values is provided below in connection with FIG. 7.

The series of acts 300 also includes an act 308 of the feature contribution system 106 determining a correction factor utilized to correct the initial contribution values. In one or more embodiments, the feature contribution system 106 determines a correction factor from the contribution values based on the set of observed features, the initial contribution values, and historical features. Further, in some embodiments, the feature contribution system 106 can apply the correction factor to the initial contribution values to obtain corrected contribution values (i.e., correction-factor adjusted feature contribution values). Additional detail regarding generating and applying a correction factor is provided below in connection with FIGS. 8-10.

As shown, the series of acts 300 includes an act 310 of the feature contribution system 106 providing a visualization displaying the corrected contribution values in response to the feature contribution request. In various embodiments, the feature contribution system 106 generates and provides a simple and intuitive visualization that explains which features influenced and impacted the local observed model result. Further, the feature contribution system 106 provides the visualization in response to the feature contribution request. For example, the feature contribution system 106 displays the visualization on the client device of a requesting user. Additional detail regarding generating and providing a visualization is provided below in connection with FIGS. 11-12.

Figures 4A, 4B:
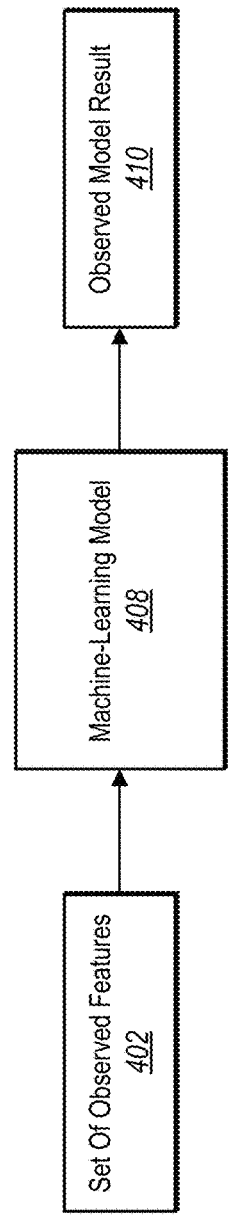
FIGS. 4A-4B illustrate determining an observed model result based on observed features in accordance with one or more embodiments.

As mentioned above, FIGS. 4A-4B illustrate observed features values and generating the observed model result. In particular, FIGS. 4A-4B illustrate determining an observed model result based on observed features in accordance with one or more embodiments. As shown, FIG. 4A includes a set of observed features 402 corresponding to a user. FIG. 4B illustrates a machine-learning model 408 applying the set of observed features 402 to generate the observed model result 410.

As illustrated, the set of observed features 402 includes features 404 and feature values 406. For example, in the set of observed features 402, the feature 404 of "Resolution" has a feature value 406 of "1920×1080." As mentioned above, the features 404 can correspond to continuous features (e.g., age of user), binary features (e.g., was a paid search involved), categorical features (e.g., device type, location, browser type, operating system), or other types of features. Similarly, the feature values 406 can correspond to any type of value (e.g., continuous, binary, categorical, or other) identified for the corresponding feature. In some embodiments, the set of observed features 402 includes hundreds of features 404, each having multiple feature values 406.

In many embodiments, the set of observed features 402 corresponds to the machine-learning model 408. In particular, the machine-learning model 408 is trained to map the feature values 406 to a predicted result. For example, in one or more embodiments, the feature contribution system 106 provides an observed feature vector of the feature values 406 to the machine-learning model 408, which generates the observed model result 410 for the user.

In general, the observed model result 410 is based on the set of observed features 402 as a whole. Indeed, different feature values 406 will result in the machine-learning model 408 generating different observed model results as well as different contribution value being attributed to each feature. However, even a small change to a single feature value out of hundreds of feature value can change the observed model result many as well as many, if not all, of the feature contribution values.

In some embodiments, the feature values 406 within the set of observed features 402 can be represented mathematically as x. In other words, x represents the observed feature vector corresponding to the feature values 406 in the set of observed features 402. In these embodiments, p can represent the number of features 404 in the set of observed features 402. Accordingly, the length of the observed feature vector is p.

In additional embodiments, the machine-learning model 408 can be represented mathematically as the function y=f(x), where the machine-learning model 408 applies feature values within observed feature vector (i.e., x) to generate a model result (i.e., y). Indeed, the machine-learning model 408 is trained to map the relationship between x and y. Further, the function y=f(•) represents the scoring function corresponding to the machine-learning model 408.

In one or more embodiments, the feature contribution system 106 detects the feature values 406 of the features 404 within the set of observed features 402 for a user. In these embodiments, the feature contribution system 106 can create an observed feature vector represented as $x^{new}$. Thus, the feature contribution system 106 can utilize the machine-learning model 408 to generate the observed model result 410 from the observed feature vector corresponding to feature values 406 (e.g., $x^{new}$) of the feature values 404 from the set of observed features 402.

To further illustrate, in one or more embodiments, the observed feature vector represented by $x^{new}$ can include observed feature values mathematically represented as: $(x_1^{new}, x_2^{new}, \ldots, x_p^{new})$, where the observed feature vector includes p number of features. Accordingly, Equation 1 below includes a mathematical representation of applying the machine-learning model 408 to the observed feature vector, where y is the observed model result 410.

$$y=\hat{f}((x_1^{new}, x_2^{new}, \ldots, x_p^{new})) \quad (1)$$

As mentioned above, the feature contribution system 106 can create sets of target-feature-modified observed features from the set of observed features 402. As also mentioned above, creating a set of target-feature-modified observed features for a target feature can require substituting feature values for the target feature (e.g., historical feature values). Thus, to provide context, FIGS. 5A-5B illustrate block diagrams of historical feature sets in accordance with one or more embodiments.

As shown, FIG. 5A includes a historical feature dataset 502 that includes features 504 and historical feature sets 506. In one or more embodiments, the historical feature dataset 502 corresponds to a machine-learning model (e.g., the machine-learning model 408) such that the features 504 in the historical feature dataset 502 align with the features utilized by the machine-learning model (e.g., the features input into the model). Indeed, in these embodiments, the features 504 of the historical feature dataset 502 can match the features 404 from the set of observed features 402 described above with respect to FIG. 4A. In alternative embodiments, the features 504 include more or different features than included in the set of observed features 402.

As shown, the historical feature value set 508 include the historical feature sets 506 having features 504 corresponding to various feature types (e.g., continuous features, binary features, and categorical features). In various embodiments, each of the historical feature sets 506 corresponds to a previously observed set of features (e.g., witnessed from other users or entities). Indeed, each of the historical feature sets 506 includes previously detected (i.e., historical) feature values for the features 504. Because the historical feature sets 506 correspond to real-world observed feature values, the historical feature sets 506 can provide an accurate and reliable representation of feature values that have been previously observed as well as the order, sequence, and, combination of the feature values within each of the historical feature sets 506. In some embodiments, the historical feature dataset 502 can include one or more synthetic sets of features. For example, the feature contribution system 106 generates one or more feature sets that include one or more synthetic feature values, such as a currently unobserved feature value and/or an unobserved combination of feature values.

In one or more embodiments, the feature contribution system 106 and/or another system utilizes the historical feature dataset 502 to train the machine-learning model. For example, in addition to including a particular sequence of feature values, a number of historical feature sets 506 include an indication of whether a particular result occurred (e.g., whether a user selected digital content or returned to a website). Using this indicator, the machine-learning model can be trained in a supervised manner.

As further described below with respect to FIG. 6A, the feature contribution system 106 can draw upon the historical feature dataset 502 to generate target-feature-modified observed feature sets. For example, in one or more embodiments, the feature contribution system 106 replaces a target feature within the set of observed features 402 with feature values for the corresponding feature from the historical feature dataset 502.

In one or more embodiments, the historical feature dataset 502 includes multiple instances of a particular feature value corresponding to a target feature. Accordingly, in some embodiments, the feature contribution system 106 maintains a frequency count of historical feature values within the historical feature dataset 502. To illustrate, FIG. 5B shows the table or list of a historical feature value set 508 that includes the features 504 as well as their historical feature values 510. In addition, the historical feature value set 508 can include a frequency count 512 of each historical feature value 510.

To further illustrate, each time an instance of a particular feature value is added to the historical feature dataset 502, the feature contribution system 106 can add and/or increment the frequency count 512 of that feature value within the historical feature value set 508 (with respect to its corresponding feature 504). As described below, the feature contribution system 106 can utilize the frequency count 512 of historical feature values 510 corresponding to a target feature (e.g., the historical feature values of the resolution feature) to reduce computational costs.

Figure 6A:
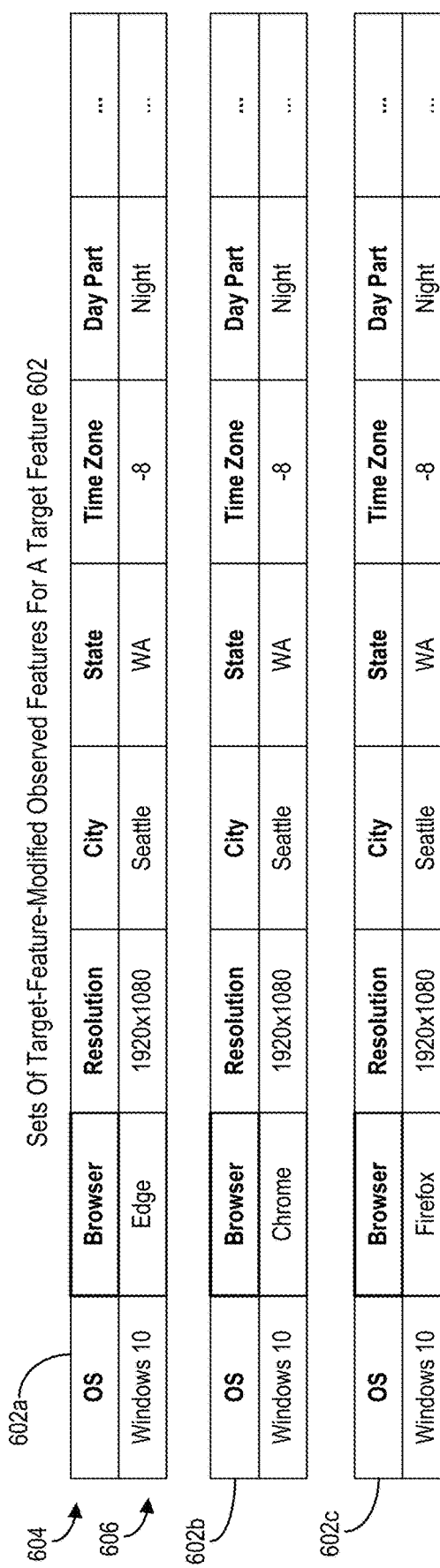
FIGS. 6A-6C illustrate generating a combined target-feature-modified model result for a target feature in accordance with one or more embodiments.
Figure 6B:
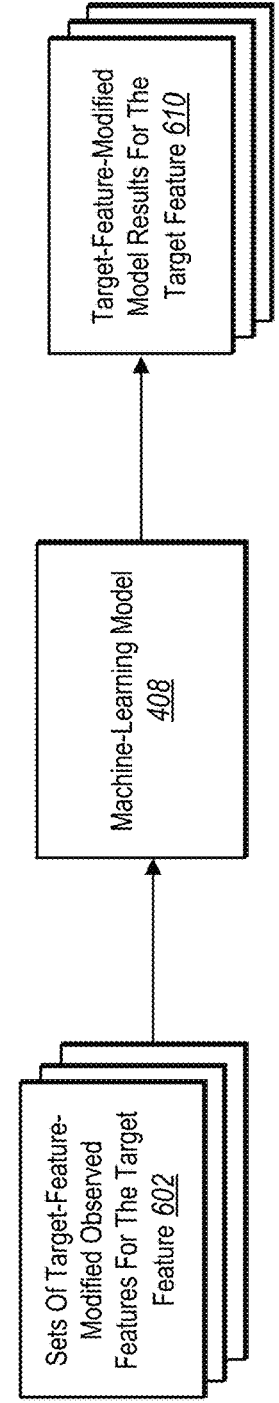
Figure 6C:
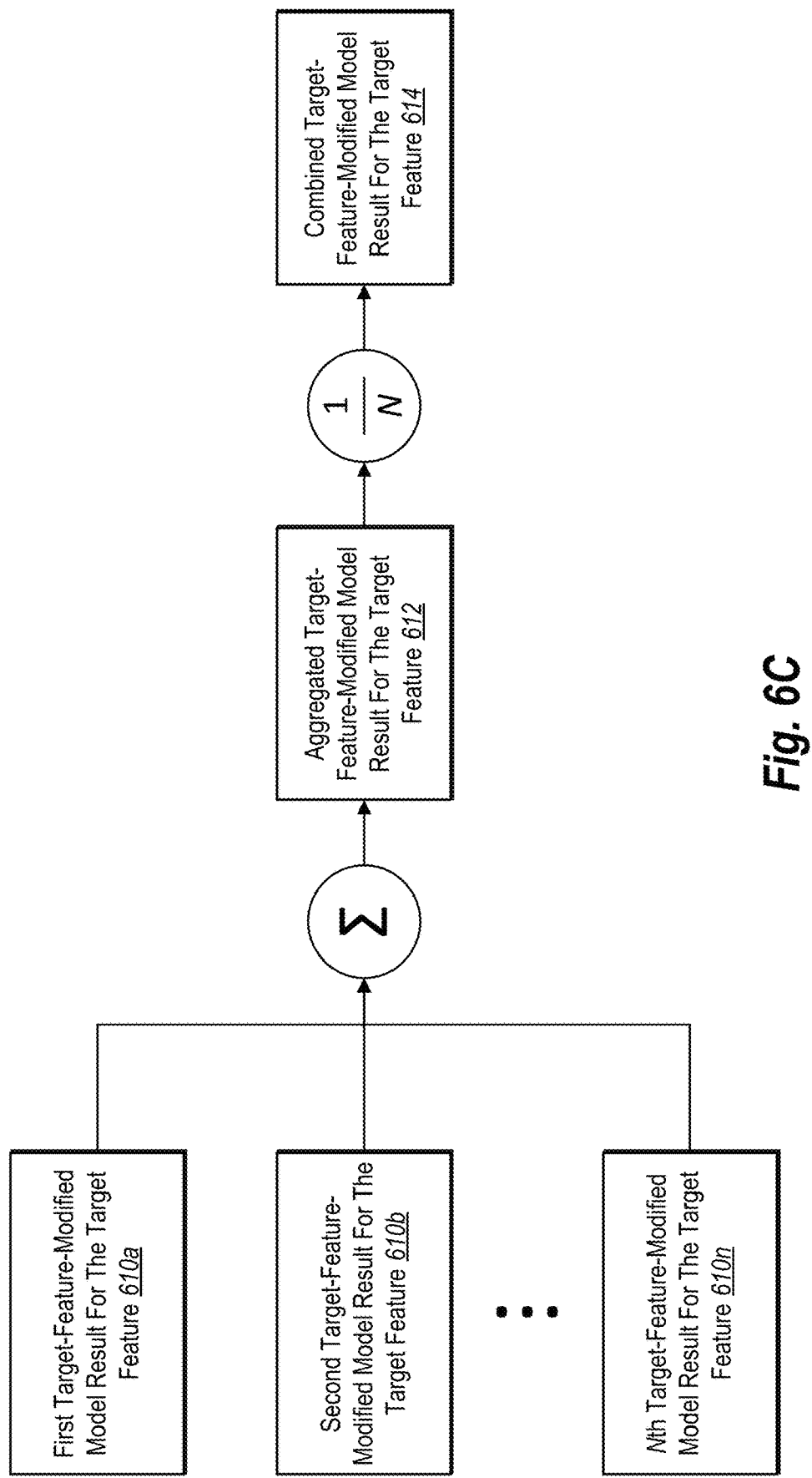

Turning now to FIGS. 6A-6C, additional detail will be provided regarding sets of target-feature-modified observed features and target-feature-modified model results. In particular, FIGS. 6A-6C illustrate generating a combined target-feature-modified model result for a target feature in accordance with one or more embodiments. While FIGS. 6A-6C correspond to a single feature within a set of observed features (e.g., the target feature), the techniques and approaches described can be repeated and applied to all features in a set of observed features.

As shown, FIG. 6A includes sets of target-feature-modified observed features for a target feature 602 (or simply "sets of target-feature-modified features 602"). In particular, the sets of target-feature-modified features 602 include a first target-feature-modified set 602a, a second target-feature-modified set 602b, and a third target-feature-modified 602c. As also shown, each of the sets of target-feature-modified features 602 includes features 604 and feature values 606.

As described above, the feature contribution system 106 can generate the sets of target-feature-modified features 602 by replacing the feature value of a target feature from a set of observed features the with a feature value from the historic feature values 510 corresponding to the target feature. Indeed, for each of the historical feature values corresponding to the target feature, the feature contribution system 106 can generate a new set of target-feature-modified observed values.

To illustrate, FIG. 6A shows the second feature (i.e., "Browser") as the target feature. Upon selecting the target feature, the feature contribution system 106 can access the historical feature dataset 502 and/or the historical feature value set 508 to identify corresponding historical feature values 510 for the feature 504 corresponding to the target feature (i.e., "Browser"). For example, the Browser feature in the historical feature value set 508 includes the historical feature values 510 of: Edge (x5), Chrome (x20), Firefox (x10), Opera (x3), Safari (x15), Internet Explorer (x2), and Navigator (x0). Accordingly, the feature contribution system 106 can replace the feature value 406 of "Firefox" from the set of observed values (e.g., the set of observed features 402 from FIG. 4A) with each of the corresponding historical feature values (e.g., for a total of 55 target-feature-modified sets). Thus, as shown in FIG. 6A, the first target-feature-modified set 602a includes the feature value of "Edge" for the Browser feature, the second target-feature-modified set 602b includes the feature value of "Chrome" for the Browser feature, and a third target-feature-modified 602c includes the feature value of "Firefox" for the Browser feature, with all other feature values from the set of observed features remaining unchanged.

While the target-feature-modified features sets 602a-602c show only three sets of target-feature-modified observed features, as just mentioned above, the feature contribution system 106 can generate a separate target-feature-modified observed features set for each of the corresponding historical feature values 510 from the historical feature database 502/historical feature value set 508. Further, in many embodiments, the feature contribution system 106 can create multiple matching copies of a target-feature-modified observed feature set if a target feature value is included multiple times in the historical feature dataset 510 with respect to the target feature.

In alternative embodiments, rather than creating multiple duplicate copies of a target-feature-modified observed feature set, the feature contribution system 106 creates a single target-feature-modified observed feature set for each unique historical feature value. In addition, the feature contribution system 106 associated the target-feature-modified observed feature set with the corresponding frequency count 512. For example, the feature contribution system 106 indicates that the target-feature-modified observed feature set corresponding to the target feature value of "Edge" for the browser feature (i.e., target feature) has a frequency count of five. Additionally, as described above, the feature contribution system 106 can repeat the above process for each feature as the target feature in the set of observed features.

In various embodiments, generating a set of target-feature-modified features for the target feature can be represented mathematically as $x_{(-j)}^{new}$, where $-j$ indicates that a feature value of the target feature is replaced with a historical feature value. More specifically, a set of target-feature-modified features for the target feature 602 can be represented mathematically as $(x_1^{new}, x_2^{new}, \ldots, x_{j-1}^{new}, x_j^i, x_{j+1}^{new}, \ldots, x_p^{new})$, where $x_j^i$ represents the target feature value being replaced within the set of observed features.

In some embodiments, the historical feature value replaces or substitutes the target feature value with the same value that was included in the set of observed features, as the observed feature value is included as one of the historical feature values in the historical feature dataset 502. To illustrate, the third target-feature-modified 602c replaces the target feature value of "Firefox" from the set of observed features with the historical feature value of "Firefox" from the historical feature dataset 502.

In one or more embodiments, the feature contribution system 106 can generate a target-feature-modified model result based on a set of target-feature-modified features. For example, FIG. 6B illustrates the feature contribution system 106 applying the machine-learning model 408 to the sets of target-feature-modified observed features for the target feature 602 to generate target-feature-modified model results for the target feature 610 (or simply "target-feature-modified model results 610").

In various embodiments, the machine-learning model 408 is the same model utilized to generate the observed model result, as described above. To this end, the machine-learning model 408 recognizes all of the feature values included in each of the sets of target-feature-modified features 602, including the substituted historical feature values 510. In fact, in many embodiments, the machine-learning model 408 has previously processed the historical feature values 510. In this manner, the machine-learning model 408 can be any type of "black box" prediction neural network and/or agnostic model framework that maps features to a result, as the feature contribution system 106 need not modify the machine-learning model 408.

As mentioned above, in one or more embodiments, a single target-feature-modified observed feature set may correspond to multiple instances of a historical feature value. In these embodiments, the feature contribution system 106 can apply the target-feature-modified observed feature once to the machine-learning model 408 to generate a target-feature-modified model result for the target feature, then copy the result according to the corresponding frequency count 512. Thus, in the above example, the feature contribution system 106 applies the target-feature-modified observed feature set with the historical browser feature value of "Edge" to the machine-learning model 408, then copies the result five times. In this manner, the feature contribution system 106 can significantly reduce computational costs as many historical feature values include duplicate instances.

In additional embodiments, the feature contribution system 106 can further generate a combined target-feature-modified model result for the target feature. To illustrate, FIG. 6C includes each of the target-feature-modified model results for the target feature 610a-610n. For simplicity, FIG. 6C includes a first target-feature-modified model result for the target feature 610a, a second target-feature-modified model result for the target feature 610b, and an Nth target-feature-modified model result for the target feature 610n.

As shown, the feature contribution system 106 can combine the target-feature-modified model results for the target feature 610a-610n to generate an aggregated target-feature-modified model result for the target feature 612 (or simply "aggregated target-feature-modified model result 612"). For example, in one or more embodiments, the feature contribution system 106 sums the target-feature-modified model results for the target feature 610a-610n.

Further, as shown in FIG. 6C, the feature contribution system 106 can normalize the aggregated target-feature-modified model result for the target feature 612 to generate a combined target-feature-modified model result for the target feature 614 (or simply "combined target-feature-modified model results 614"). For example, in one or more embodiments, the feature contribution system 106 divides the aggregated target-feature-modified model result for the target feature 612 by the number of target-feature-modified model results for the target feature 610a-610n (e.g., N). In some embodiments, the feature contribution system 106 divides the aggregated target-feature-modified model result for the target feature 612 by the total number of historical feature value instances (e.g., the number of historical feature sets or $N_{historical}$).

In one or more embodiments, the combined target-feature-modified model result for the target feature 614 can be represented mathematically as shown in Equation 2 below.

$$\hat{f}(x_{(-j)}^{new}) = \frac{1}{N_{historical}} \sum_{i \in historical} \hat{f}((x_1^{new}, x_2^{new}, \ldots, x_{j-1}^{new}, x_j^i, x_{j+1}^{new}, \ldots, x_p^{new})) \quad (2)$$

As shown in Equation 2, the feature contribution system 106 determines a target-feature-modified model result for each of the target-feature-modified observed feature sets, sums together the target-feature-modified model results for the target feature (e.g., the aggregated target-feature-modified model result for the target feature 612), then normalizes the aggregated target-feature-modified model result for the target feature 612 to obtain the combined target-feature-modified model result for the target feature 614.

Figure 7:
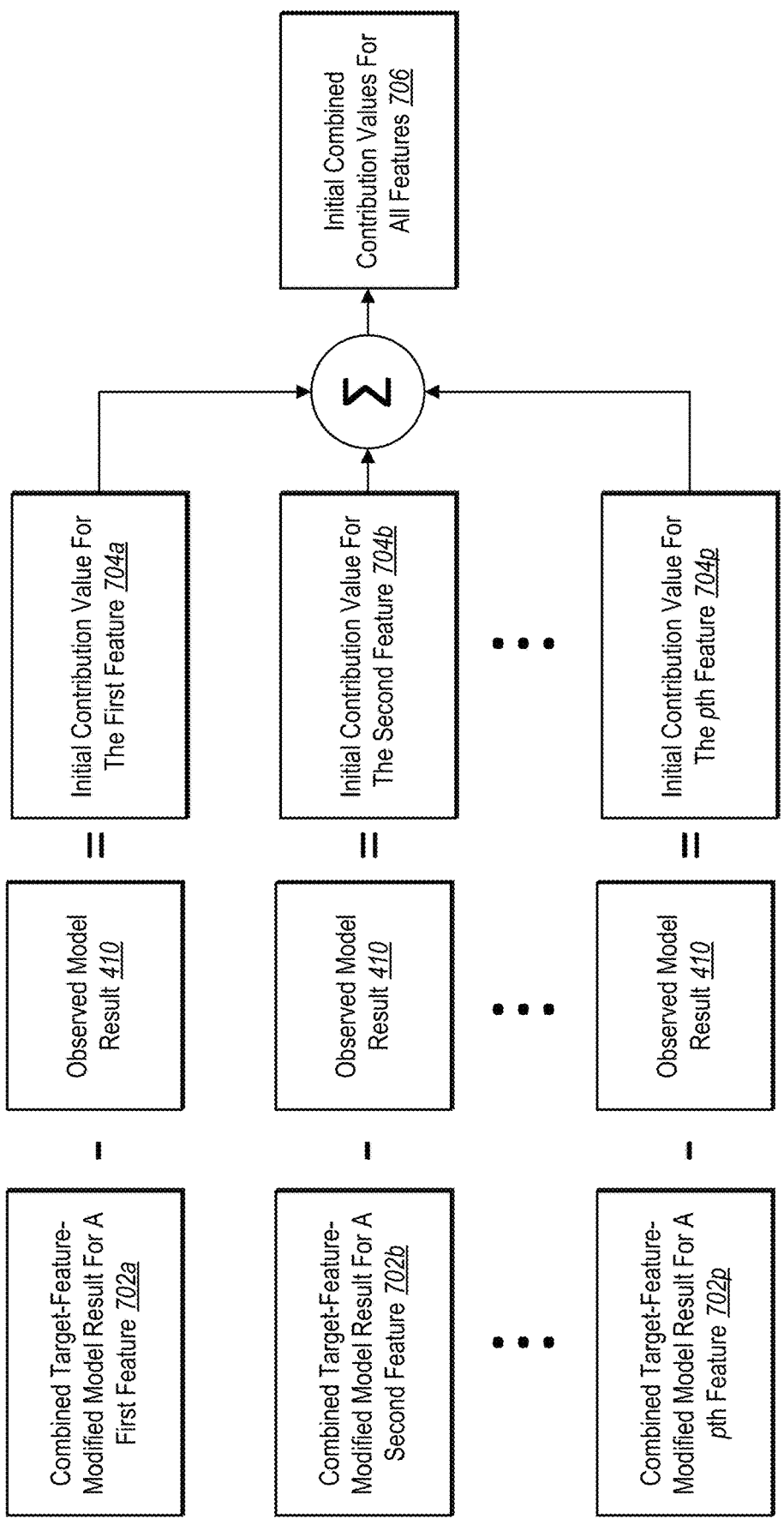
FIG. 7 illustrates generating initial contribution values for each feature in accordance with one or more embodiments.

As mentioned above, the feature contribution system 106 can also determine initial contribution values for the observed model result. To illustrate, FIG. 7 shows generating initial contribution values for each feature in accordance with one or more embodiments. In particular, FIG. 7 includes the feature contribution system 106 comparing a combined target-feature-modified model result for a first feature 702a with the observed model result 410 to determine the initial contribution value for the first feature 704a. As shown in the illustrated embodiment, the feature contribution system 106 can perform the comparison by subtracting the observed model result 410 from the combined target-feature-modified model result for a first feature 702a. Here, the target feature corresponds to the first feature of the set of observed features.

In addition, the feature contribution system 106 can determine the initial contribution values for each of the p features corresponding to the observed model result 410. For example, FIG. 7 also shows the feature contribution system 106 comparing a combined target-feature-modified model result for a second feature 702b with the observed model result 410 to determine the initial contribution value for the second feature 704b. Here, the target feature corresponds to the second feature of the set of observed features.

Further, as shown, the feature contribution system 106 can utilize the same observed model result 410 in determining the initial contribution value for each of the features. In this manner, the feature contribution system 106 can determine the effect of the target feature with respect to the observed model result. Indeed, the combined target-feature-modified model result for the target feature generates a model result corresponding to the machine-learning model 408 applying all the feature values in the set of observed features (while replacing the target feature value with historical feature values). Meanwhile, the observed model result corresponds to the machine-learning model applying all of the feature value of the set of observed features, including the target feature. Thus, by comparing these two results, the feature contribution system 106 can generate a numerical value indicating how much the observed feature value for the target feature changed the model result (i.e., the contribution value of the target feature).

In one or more embodiments, the mathematical representation of determining an initial contribution value for a target feature is shown by Equation 3 below. In Equation 3, C represents a contribution value and j represents each target feature from 1–p within the set of observed features utilized to obtain the observed model result 410. Notably, Equation 3 subtracts Equation 1 from the Equation 2.

$$C_j = \hat{f}(x_{(-j)}^{new}) - \hat{f}(x^{new}) \qquad (3)$$

FIG. 7 also shows combining the initial contribution values to generate an initial combined contribution value for all features 706 (or simply "initial combined contribution values 706"). In particular, in various embodiments, the feature contribution system 106 can aggregate or sum each of the initial contribution values to generate the initial combined contribution values 706.

In one or more embodiments, the initial combined contribution values 706 can match a combined historical features model result, which can represent the averaged predicted outcome of the historical feature value from the historical feature dataset. However, in many embodiments, the initial combined contribution values 706 (e.g., the additivity of initial contribution values) does not equal the combined historical features model result. Accordingly, the feature contribution system 106 can generate a correction factor that aligns the initial combined contribution values 706 with the combined historical features model result.

Figure 8:
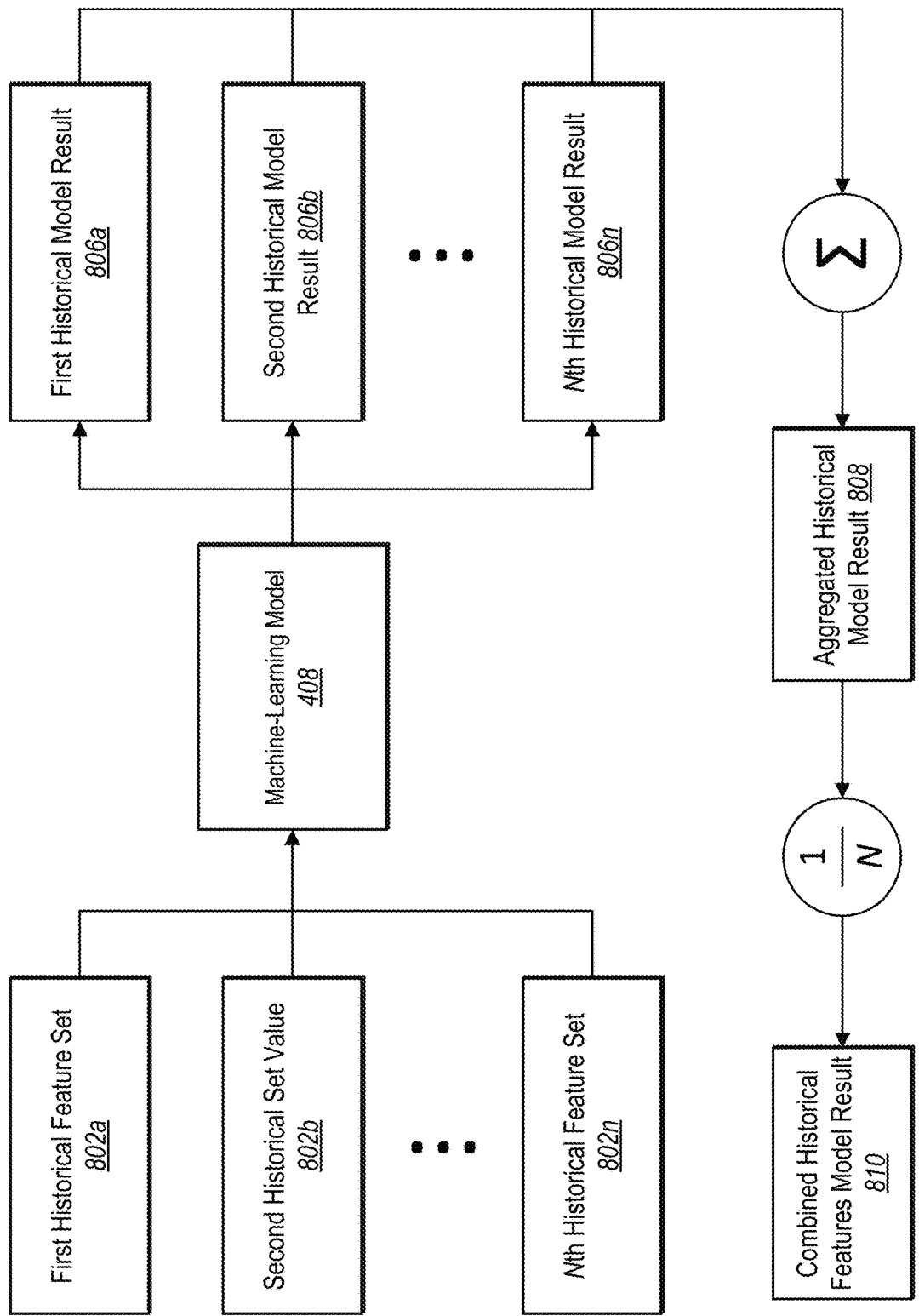
FIG. 8 illustrates generating a combined historical model result in accordance with one or more embodiments.

As additional context, additional detail is now provided regarding the combined historical features model result. For example, FIG. 8 illustrates generating a combined historical model result in accordance with one or more embodiments. As shown, FIG. 8 includes the feature contribution system 106 determining a combined historical features model result 810 based on the historical feature sets 506 from the historical feature dataset 502.

As illustrated, the feature contribution system 106 identifies a first historical feature set 802a. For example, the first historical feature set 802a corresponds to the first historical feature set 506 from the historical feature dataset 502. Additionally, the feature contribution system 106 can apply the machine-learning model 408 to the first historical feature set 802a to generate the first historical model result 806a.

In additional embodiments, the feature contribution system 106 can identify a second historical feature set 802b from the historical feature sets 506 and utilize the machine-learning model 408 to generate a second historical model result 806b. Likewise, as shown, the feature contribution system 106 can generate N number (e.g., $N_{historical}$) of historical feature sets where N corresponds to the number of historical feature sets 506 in the historical feature dataset 502 (shown as the Nth historical feature set 802n and Nth historical model result 806n).

In one or more embodiments, generating a historical model result of each single historical feature set (e.g., $x^i$) from the historical feature sets 506 can be represented mathematically as shown in Equation 4.

$$\hat{f}(x^i) \qquad (4)$$

FIG. 8 also includes the feature contribution system 106 combining the historical model results. In particular, FIG. 8 illustrates the feature contribution system 106 summing each of the historical model results 806a-806n to generate an aggregated historical model result 808. Additionally, in various embodiments, the feature contribution system 106 can normalize (e.g., divide) the aggregated historical model result 808 by the number of historical feature sets 506 (e.g., $N_{historical}$) in the historical feature dataset 502 to generate a combined historical model result 810 (e.g., a combined historical features model result).

In some embodiments, generating the combined historical features model result 810 (i.e., $E_{historical}$) can be represented mathematically, as shown in Equation 5 below.

$$E_{historical} = \frac{1}{N_{historical}} \Sigma_{i \in historical} \hat{f}(x^i) \qquad (5)$$

As shown in Equation 5, the feature contribution system 106 can sum or aggregate together the historical model results corresponding to all of the historical feature sets 506 in the historical feature dataset 502. Further, the feature contribution system 106 can divide the aggregated historical model result 808 by the number of historical feature sets 506 in the historical feature dataset 502 (e.g., $N_{historical}$). Indeed, in some embodiments, the combined historical features model result 810 can represent the average of the predicted model results over the entire historical feature dataset 502.

Figure 9A:
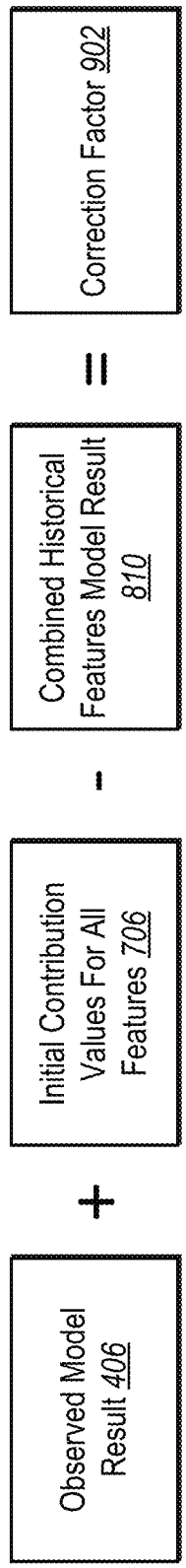
FIGS. 9A-9B illustrate generating a correction factor in accordance with one or more embodiments.
Figure 9B:
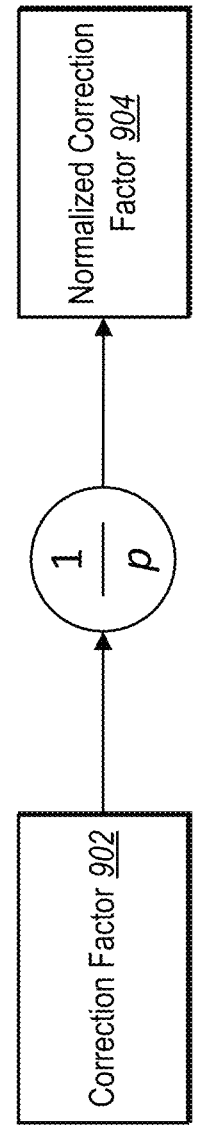

As described above, the feature contribution system 106 can generate a correction factor that aligns the initial combined contribution values 706 with the combined historical features model result 810. To illustrate, FIGS. 9A-9B illustrate generating a correction factor in accordance with one or more embodiments. As shown, FIG. 9A includes the feature contribution system 106 generating a correction factor 902 based on the observed model result 410, the initial combined contribution values 706, and the combined historical features model result 810. In particular, FIG. 9A shows the feature contribution system 106 generating the correction factor 902 by summing or adding the observed model result 410 with the initial combined contribution values 706 and subtracting the combined historical features model result 810.

As mentioned above, the correction factor can enable the feature contribution system 106 to align the initial combined contribution values 706 with the combined historical features model result 810. As mentioned above, applying the contribution values for an observed model result to the observed model result should yield the combined historical features model result. However, in most embodiments, this application does not result in the combined historical features model result. Accordingly, the feature contribution system 106 generates a correction factor that aligns the initial contribution values and the observed model result with the combined historical features model result.

In some embodiments, the feature contribution system 106 can determine the correction factor 902 (i.e., $\partial$), as shown in Equation 6 below.

$$\delta = \hat{f}(x^{new}) + \Sigma_{j=1}^{P} C_j - E_{test} \qquad (6)$$

In one or more embodiments, the feature contribution system 106 can further generate a normalized correction factor. To illustrate, FIG. 9B shows the feature contribution system 106 dividing the correction factor 902 by the number of features in the set of observed features (i.e., p) to generate a normalized correction factor 904 (i.e., ∂/p). Indeed, the feature contribution system 106 can normalize the correction factor 902 based on the number of observed features corresponding to the observed model result 410.

Upon determining the correction factor 902 and/or the normalized correction factor 904, in one or more embodiments, the feature contribution system 106 can determine corrected contribution values. To illustrate, FIG. 10 shows generating corrected contribution values for each of the features in accordance with one or more embodiments. As shown, the feature contribution system 106 can generate a corrected contribution value (i.e., a correction-factor adjusted contribution value) based on the initial contribution values and the correction factor.

In various embodiments, the feature contribution system 106 can generate corrected contribution values by modifying each of the initial contribution values by a ratio (i.e., ∂/p) between the correction factor (i.e., ∂) and the number of features in the set of observed features (i.e., p). To further illustrate, FIG. 10 shows the feature contribution system 106 generating a corrected contribution value for a first feature 1002a by applying (e.g., subtracting) the initial contribution value for a first feature 704a from the normalized correction factor 904. In some embodiments, the feature contribution system 106 can sum, multiply, divide, or otherwise apply the normalized correction factor 904 to the initial contribution value for a first feature 704a to generate the corrected contribution value for a first feature 1002a.

Similarly, the feature contribution system 106 can generate a corrected contribution value for a second feature 1002b by applying the initial contribution value for a second feature 704b from the normalized correction factor 904. The feature contribution system 106 can repeat the above process for each of the p features in the set of observed features (shown as the initial contribution value for the pth feature 704p and the corrected contribution value for the pth feature 1002p). In this manner, the feature contribution system 106 can generate accurate and consistent estimates of the feature effect of each feature utilized in the observed model result.

In various embodiments, the feature contribution system 106 can generate the corrected contribution values as shown in Equation 7 below, where C* represents a corrected contribution value and j represents each target feature from 1-p within the set of observed features utilized to obtain the observed model result 410. Also, as noted above, the ratio of ∂/p corresponds to the normalized correction factor 904.

$$C_j^* = C_j - \frac{\delta}{p} \quad (7)$$

Notably, generating the corrected contribution values is a linear, lightweight approach that is computationally inexpensive. In this manner, the feature contribution system 106 can easily generate corrected contribution values for a large number of features corresponding to a large number of requests without taxing the resources of a computing device. Indeed, because this approach is linear (e.g., O(p) operations) and not exponential (e.g., $O(p^2)$ operations), the feature contribution system 106 can fulfill a large number of requests (e.g., millions) for an observed model result that includes a large number of features (e.g., hundreds) in real- or near-real-time.

Upon generating the corrected contribution values for each feature within the set of observed features, the feature contribution system 106 can verify that the corrected contribution values align the observed model result with the combined historical features model result 810. For example, the feature contribution system 106 can utilize the formula shown in Equation 8 below to confirm that adding the contributions from all of the features on the observed model result equals the combined historical features model result 810.

$$E_{historical} = \hat{f}(x^{new}) + \Sigma_{j=1}^{p} C_j^* \quad (8)$$

As mentioned above, using the corrected contribution values, the feature contribution system 106 can reconcile the observed model result of the user with the combined historical features model result 810. In this manner, the additivity of contribution values (i.e., corrected contribution values) can represent the difference between the observed model result for the user and the combined historical features model result 810. Moreover, contribution values can be added together to reflect contributions for any combination of features.

FIG. 4A-FIG. 10 describe various embodiments of determining corrected contribution values corresponding to an observed model result. Accordingly, the actions, algorithms, and equations described in connection with FIG. 4A-FIG. 10 provide example acts and algorithms (e.g., structure or architecture) for performing a step for determining correction-factor adjusted feature contribution values of the predictive result. For instance, at least Equations 1-8 provides actions, structure, and/or algorithms corresponding to the feature contribution system 106 generating correction-factor adjusted feature contribution values (e.g., corrected contribution values for features 1002a-1002p) of the predictive result.

Figure 11:
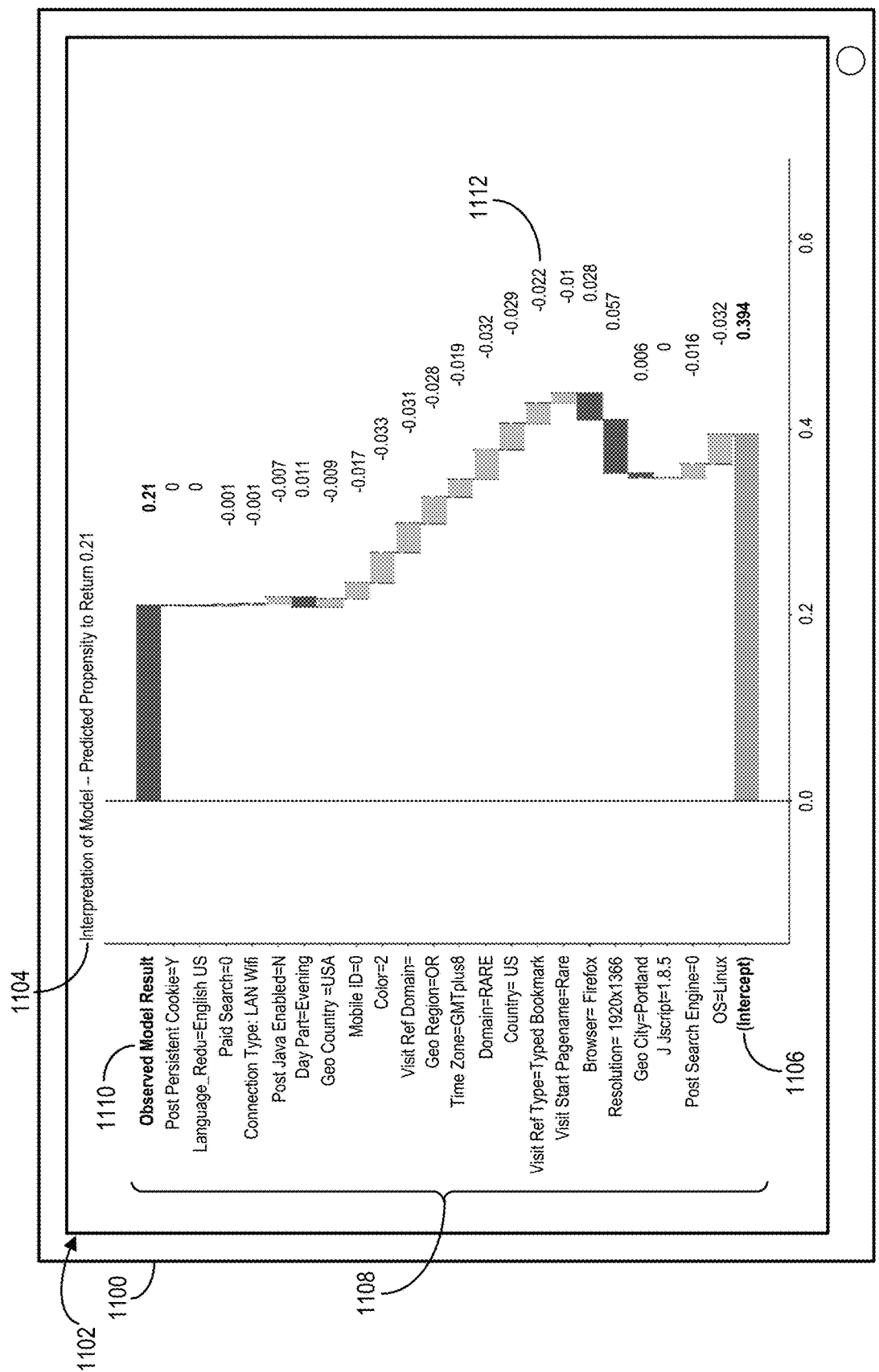
FIG. 11 illustrates a graphical user interface displaying contribution values of features of a model for a user in accordance with one or more embodiments.
Figure 12:
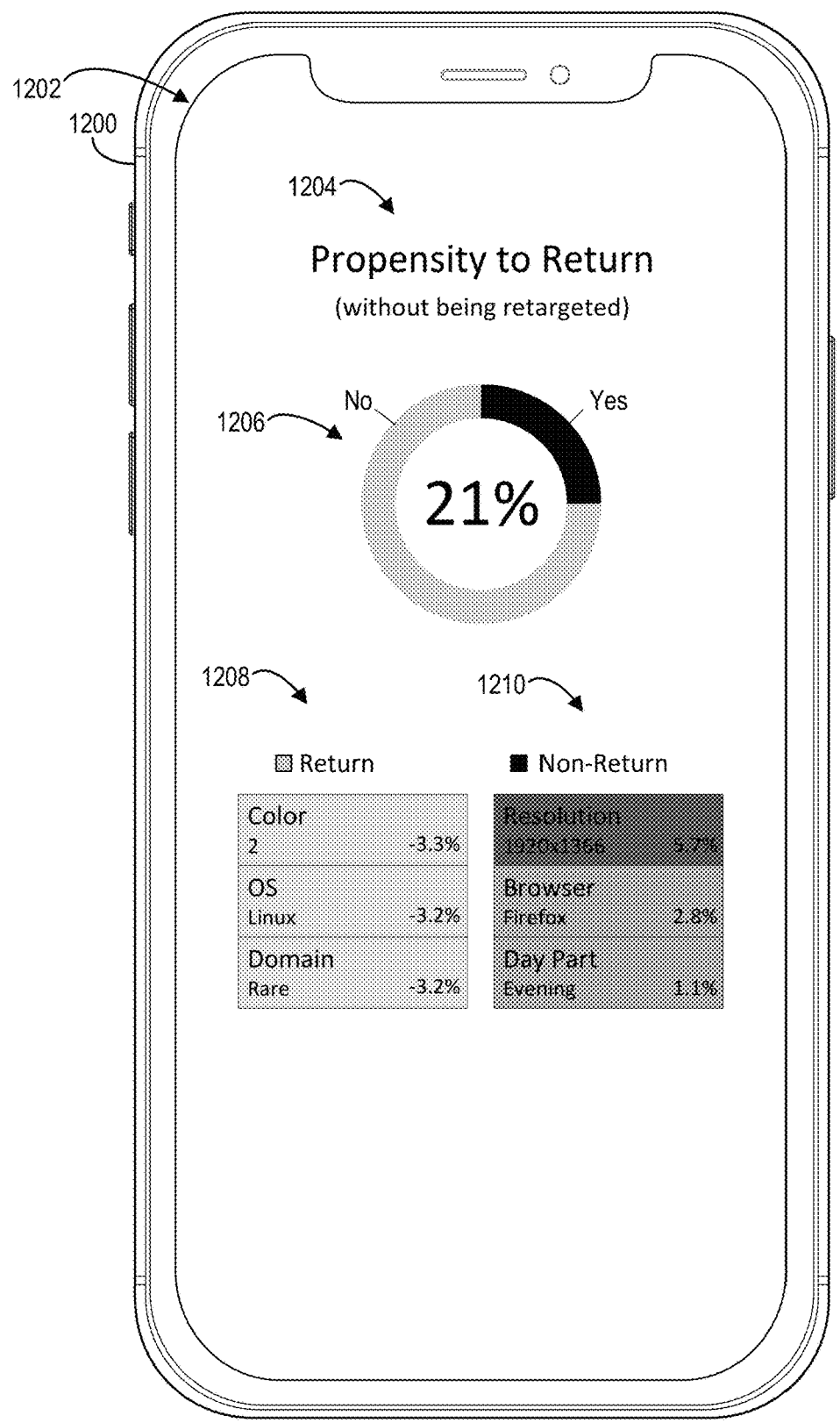
FIG. 12 illustrates a graphical user interface displaying a simplified visualization of select contribution values corresponding to an observed model result in accordance with one or more embodiments.

Turning now to FIG. 11 and FIG. 12, example graphical results of corrected contribution values will be provided. For example, FIG. 11 illustrates a computing device 1100 having a graphical user interface 1102 displaying corrected contribution values of features of a machine-learning model for a user in accordance with one or more embodiments. In various embodiments, the computing device 1100 is a client device associated with a user requesting a feature contribution analysis corresponding to an observed model result. In alternative embodiments, the computing device 1100 is a server device accessible by an administrator user.

As shown, the graphical user interface 1102 includes a model interpretation visualization 1104 that displays a machine-learning model interpretation of the contribution values corresponding to a user's likelihood to return to a particular website. As illustrated in FIG. 11, the observed model result for the user is 0.21. For context, the example described above in connection with FIG. 2 provides an example of determining a user's propensity to return to the company's website. A machine-learning model applied the set of observed features for the user and generated the user's observed model result between 0 and 1 that indicated the user's propensity to return to the company's website. As mentioned above, a high score (e.g., close to 1) indicates that the visitor will return on their own. A low score (e.g., close to 0) indicates that the user is a bot or an anonymous visitor that is not likely to return even if retargeted. A score in the middle (e.g., 0.2-0.6) indicates that the user is more likely to return with a reminder (e.g., a retargeted digital content item).

The model interpretation visualization 1104 includes the combined historical features model result corresponding to the machine-learning model (e.g., the intercept 1106 on the bottom row of the table). In addition, the model interpretation visualization 1104 includes each of the features 1108 applied by the machine-learning model (e.g., the middle rows). Further, the model interpretation visualization 1104 includes the observed model result 1110 for the user (e.g., the top row).

As shown, the features 1108 include contribution values 1112 (i.e., corrected contribution values) that indicate how each feature contributed to the observed model result 1110. In general, the contribution values 1112 show how the observed model result 1110 was determined from the combined historical features model result based on the contributions of each feature. More particularly, the contribution values 1112 indicate the increase or decrease in the result due to the user having a certain feature value for a target feature. For instance, using a Linux operating system is shown as decreasing the user's propensity to return by 0.032. Accordingly, by adding all of the contribution values 1112 to the combined historical features model result, the feature contribution system 106 arrives at the observed model result 1110 indicating the final predicted propensity to return score for the user While the model interpretation visualization 1104 arranges the features 1108 in a particular order, the feature contribution system 106 can display the features 1108 in any order. For example, the feature contribution system 106 groups features having positive effects and features having negative effects together. In another example, the feature contribution system 106 orders the features 1108 from largest effect (e.g., largest absolute feature value) to smallest effect, or vise versa. Further, the feature contribution system 106 can order the features 1108 alphabetically.

In some embodiments, the feature contribution system 106 provides a simplified visualization to a user in response to a user request. Indeed, while the model interpretation visualization 1104 in FIG. 11 is visually valuable, in some instances, it may be difficult to fully display the visualization on a client device (e.g., a smartphone) and/or difficult to enable a user to quickly comprehend feature effects of features corresponding to an observed model result on a smaller screen.

Accordingly, FIG. 12 illustrates a computing device 1200 that includes a graphical user interface 1202 displaying a visualization of select contribution values corresponding to an observed model result in accordance with one or more embodiments. In various embodiments, the computing device 1200 is a client device associated with a user requesting a feature contribution analysis corresponding to an observed model result.

As shown in FIG. 12, the graphical user interface 1202 includes an observed model result visualization 1204 that displays a user's propensity to return to a website. The model result visualization 1204 can correspond to the corrected contribution values included in the model interpretation visualization 1104 of FIG. 11. As also shown in FIG. 12, the observed model result visualization 1204 includes multiple graphics, such as a propensity to return graph 1206, a negative propensity to return list 1208, and a positive propensity to return list 1210.

To illustrate, the propensity to return graph 1206 is shown as a pie chart of the aggregated breakdown of positive and negative features contributing to the observed model result, where the negative contributing features outweigh the positive contributing features. Further, the propensity to return lists include the most influential positive and negative contributing features. As shown, the negative propensity to return list 1208 shows the top three negative features, where each negative feature indicates its feature value and correction-factor adjusted contribution value. Likewise, the positive propensity to return list 1210 shows the top three positive features along with their corresponding feature value and corrected correction-factor adjusted contribution value.

In various embodiments, the feature contribution system 106 can employ multiple visual indicators to allow users to easily and intuitively comprehend the return observed model result visualization 1204. For instance, in addition to text labels and ordered lists, the feature contribution system 106 utilizes different colors as well as varying saturation levels, transparencies, and/or shades to indicate the effects of the features. For example, the feature contribution system 106 can utilize the color of red to represent negative contributing features and the color of green to represent positive contributing features. Further, as illustrated with respect to the positive propensity to return list 1210, the feature contribution system 106 can increase the saturation level of a feature's color proportional to the strength of the features corrected contribution value. To illustrate, the positive propensity to return list 1210 shows the resolution feature (e.g., corrected contribution value of 5.7%) with a deeper color saturation than the day part features (e.g., corrected contribution value 1.1%).

While FIG. 12 illustrates particular graphics in a particular arrangement, the feature contribution system 106 can utilize a variety of different types, numbers, or arrangements of graphics. In addition, the feature contribution system 106 can apply different visualization effects to differentiate the feature contributions of the observed model result.

Moreover, in additional embodiments, the feature contribution system 106 can provide more detailed information in response to a user selection for more information. For example, upon detecting a user information selection request, the feature contribution system 106 provides the user with the model interpretation visualization 1104 of FIG. 11. In some embodiments, the feature contribution system 106 can expand a particular graphic to provide more detail to the user (e.g., show additional entries from the positive propensity to return list).

Figure 13:
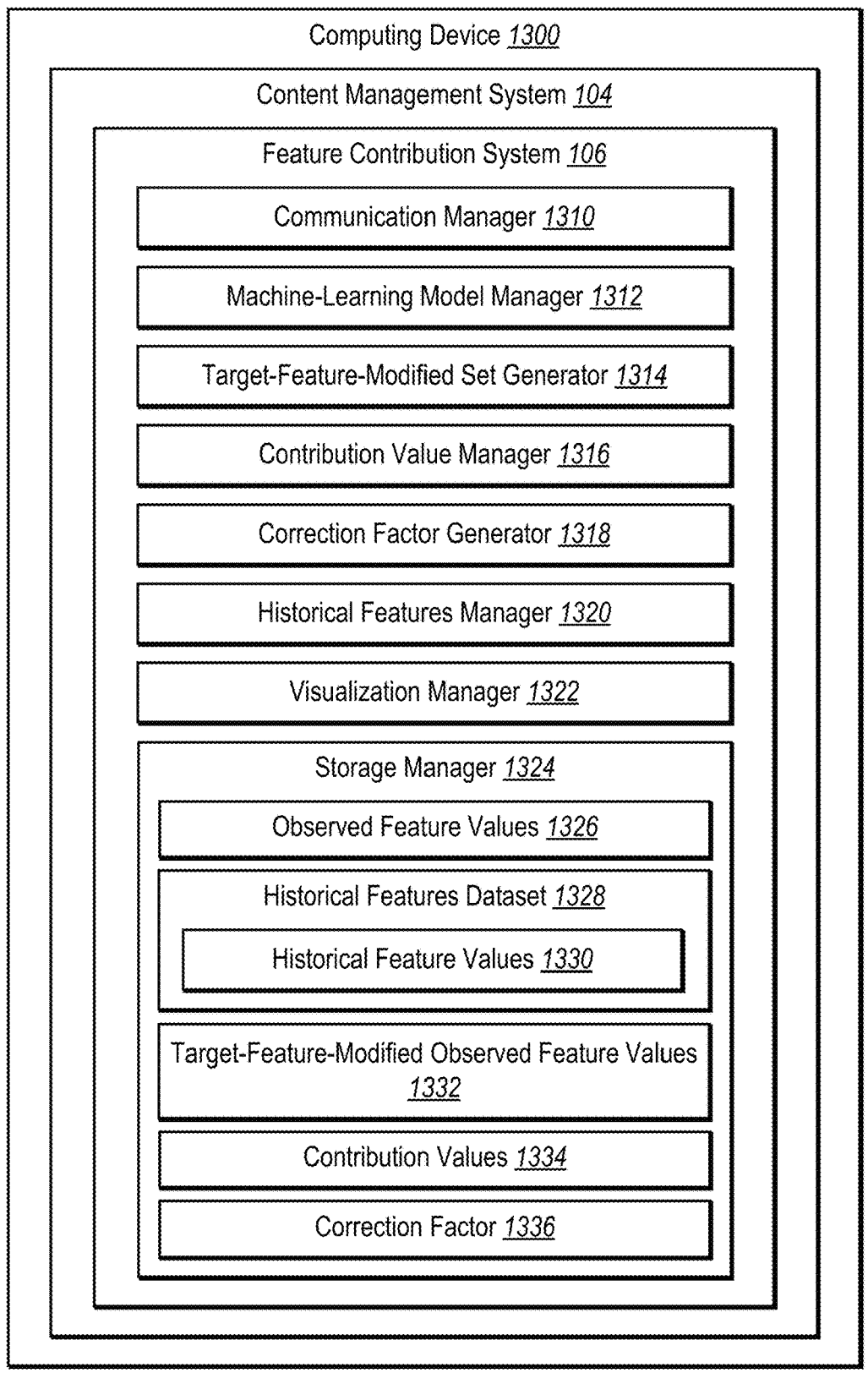
FIG. 13 illustrates a schematic diagram of a feature contribution system in accordance with one or more embodiments.

Referring now to FIG. 13, additional detail is provided regarding the capabilities and components of the feature contribution system 106 in accordance with one or more embodiments. In particular, FIG. 13 shows a schematic diagram of an example architecture of the feature contribution system 106 implemented within the content management system 104 and hosted on a computing device 1300. The content management system 104 can correspond to the content management system 104 described previously in connection with FIG. 1.

As shown, the feature contribution system 106 is located on a computing device 1300 within a content management system 104. In general, the computing device 1300 may represent various types of computing devices. For example, in some embodiments, the computing device 1300 is a non-mobile computing device, such as a server (e.g., server devices 102, 108), cluster of servers, desktop, or another type of non-mobile computing device. In one or more embodiments, the computing device 1300 is a mobile computing device, such as a laptop, a tablet, a mobile telephone, a smartphone, etc. Additional details with regard to the computing device 1300 are discussed below with respect to FIG. 15.

As illustrated in FIG. 13, the feature contribution system 106 includes various components for performing the processes and features described herein. For example, the feature contribution system 106 includes a communication manager 1310, a machine-learning model manager 1312, a target-feature-modified set generator 1314, a contribution value manager 1316, a correction factor manager 1318, a historical feature manager 1320, a visualization manager 1322, and a storage manager 1324, which includes observed feature values, a historical feature dataset 1328 having historical feature values 1330, target-feature-modified observed feature values 1332, contribution values 1334, and a correction factor 1336. Each of the components mentioned above is described below in turn.

As shown, the feature contribution system 106 includes the communication manager 1310. In general, the communication manager 1310 detects, receives, and/or otherwise obtains communications from a user or entity (e.g., a non-user computing device) with respect to an observed model result. For instance, the communication manager 1310 detects a user's request for a feature contribution analysis corresponding to an observed model result, as described above. In addition, the for feature contribution analysis corresponding to an observed model result can also send, display, and/or otherwise provide communications to the user or entity. For example, the communication manager 1310 provides a feature contribution visualization in response to a request, as described above.

As shown, the feature contribution system 106 includes the machine-learning model manager 1312. In various embodiments, the machine-learning model manager 1312 creates, generates, trains, updates, applies, utilizes, and/or maintains machine-learning models in connection with an observed model result. In some embodiments, the machine-learning model manager 1312 can also detect, receive, obtain store, retrieve, and/or otherwise maintain a set of observed features (e.g., the observed feature values 1326). For example, the machine-learning model manager 1312 applies observed feature values 1326, target-feature-modified observed feature values 1332, and historical feature values 1330 to generate model results, as described above. As shown, in some embodiments, the machine-learning model manager 1312 can store and/or retrieve the observed feature values 1326, the historical feature values 1330, and/or the target-feature-modified observed feature values 1332 with respect to the storage manager 1324.

As shown, the feature contribution system 106 includes the target-feature-modified set generator 1314. In one or more embodiments, the target-feature-modified set generator 1314 can generate, copy, modify, edit, store, retrieve, delete, remove, and/or otherwise manage sets of target-feature-modified observed features, which includes the target-feature-modified observed feature values 1332. For example, the target-feature-modified set generator 1314 can generate sets of target-feature-modified observed features for a target feature with respect to a set of observed features, as described above. As shown, in some embodiments, the target-feature-modified set generator 1314 can store and/or retrieve the target-feature-modified observed feature values 1332 with respect to the storage manager 1324.

As shown in FIG. 13, the feature contribution system 106 includes the contribution value manager 1316. In one or more embodiments, the contribution value manager 1316 can generate, edit, update, correct, modify, store, retrieve, and/or otherwise manage the contribution values 1334. As described above, contribution values 1334 can include initial contribution values as well as corrected contribution values (i.e., correction-factor adjusted contribution values). For example, the contribution value manager 1316 can update initial contribution values to obtain corrected contribution values, as described above. As shown, in some embodiments, the contribution value manager 1316 can store and/or retrieve the contribution values 1334 with respect to the storage manager 1324.

As shown, the feature contribution system 106 includes the correction factor generator 1318. In various embodiments, the correction factor generator 1318 can generate, edit, update, correct, modify, store, retrieve, and/or otherwise manage the correction factor 1336. For example, the correction factor generator 1318 generates a correction factor based on the observed model result, the initial contribution values of features corresponding to an observed model result, and a combined historical features model result, as described above. In additional embodiments, the correction factor generator 1318 can also generate and/or determine a normalized correction factor as described above. Further, in some embodiments, the correction factor generator 1318 can generate (e.g., in connection with the contribution value manager 1316) corrected contribution values utilizing the correction factor 1336. As shown, in some embodiments, the correction factor generator 1318 can store and/or retrieve the correction factor 1336 with respect to the storage manager 1324.

As shown, the feature contribution system 106 includes the historical feature manager 1320. In one or more embodiments, the historical feature manager 1320 can generate, edit, update, correct, modify, store, retrieve, and/or otherwise manage the historical feature values 1330. In some embodiments, the historical feature manager 1320 can maintain the historical feature values 1330 within sets of target-feature-modified observed features. For example, the historical feature manager 1320 provides historical feature values 1330 to the target-feature-modified set generator 1314, which generates sets of target-feature-modified observed features, as described above. In another example, the historical feature manager 1320 works in connection with the machine-learning model manager 1312 to generate a combined historical features model result, as described above. As shown, in some embodiments, the historical feature manager 1320 can store and/or retrieve the historical feature values 1330 (e.g., as part of a set of target-feature-modified observed features) within the historical feature dataset 1328 with respect to the storage manager 1324.

As shown, the feature contribution system 106 includes the visualization manager 1322. In various embodiments, the visualization manager 1322 can generate, edit, update, correct, modify, store, retrieve, and/or otherwise manage feature contribution visualizations. For example, the visualization manager 1322 can generate one or more graphics depicting corrected contribution values of a local (i.e., individual) observed model result, as described above. Further, the visualization manager 1322 can enhance elements within a feature contribution visualization to simplify and clarify the observed model result for a user.

Each of the components 1310-1336 of the feature contribution system 106 can include software, hardware, or both. For example, the components 1310-1336 can include one or more instructions stored on a computer-readable storage medium and executable by processors of one or more computing devices, such as a client device (e.g., a mobile client device) or server device. When executed by the one or more processors, the computer-executable instructions of the feature contribution system 106 can cause a computing device to perform the feature learning methods described herein. Alternatively, the components 1310-1336 can include hardware, such as a special-purpose processing device to perform a certain function or group of functions. In addition, the components 1310-1336 of the feature contribution system 106 can include a combination of computer-executable instructions and hardware.

Furthermore, the components 1310-1336 of the feature contribution system 106 may be implemented as one or more operating systems, as one or more stand-alone applications, as one or more modules of an application, as one or more plug-ins, as one or more library functions or functions that may be called by other applications, and/or as a cloud-computing model. Thus, the components 1310-1336 may be implemented as a stand-alone application, such as a desktop or mobile application. Additionally, the components 1310-1336 may be implemented as one or more web-based applications hosted on a remote server. The components 1310-1336 may also be implemented in a suite of mobile device applications or "apps." To illustrate, the components 1310-1336 may be implemented in an application, including but not limited to ADOBE CREATIVE CLOUD, ADOBE EXPERIENCE CLOUD, ADOBE EXPERIENCE MANAGER, ADOBE MARKETING CLOUD, or other digital content applications software packages. The foregoing are either registered trademarks or trademarks of Adobe Systems Incorporated in the United States and/or other countries.

FIGS. 1-13, the corresponding text, and the examples provide a number of different methods, systems, devices, and non-transitory computer-readable media of the feature contribution system 106. In addition to the foregoing, one or more embodiments can also be described in terms of flowcharts comprising acts for accomplishing a particular result, such as the flowcharts of acts shown in FIG. 14. Additionally, the acts described herein may be repeated or performed in parallel with one another or parallel with different instances of the same or similar acts.

Figure 14:
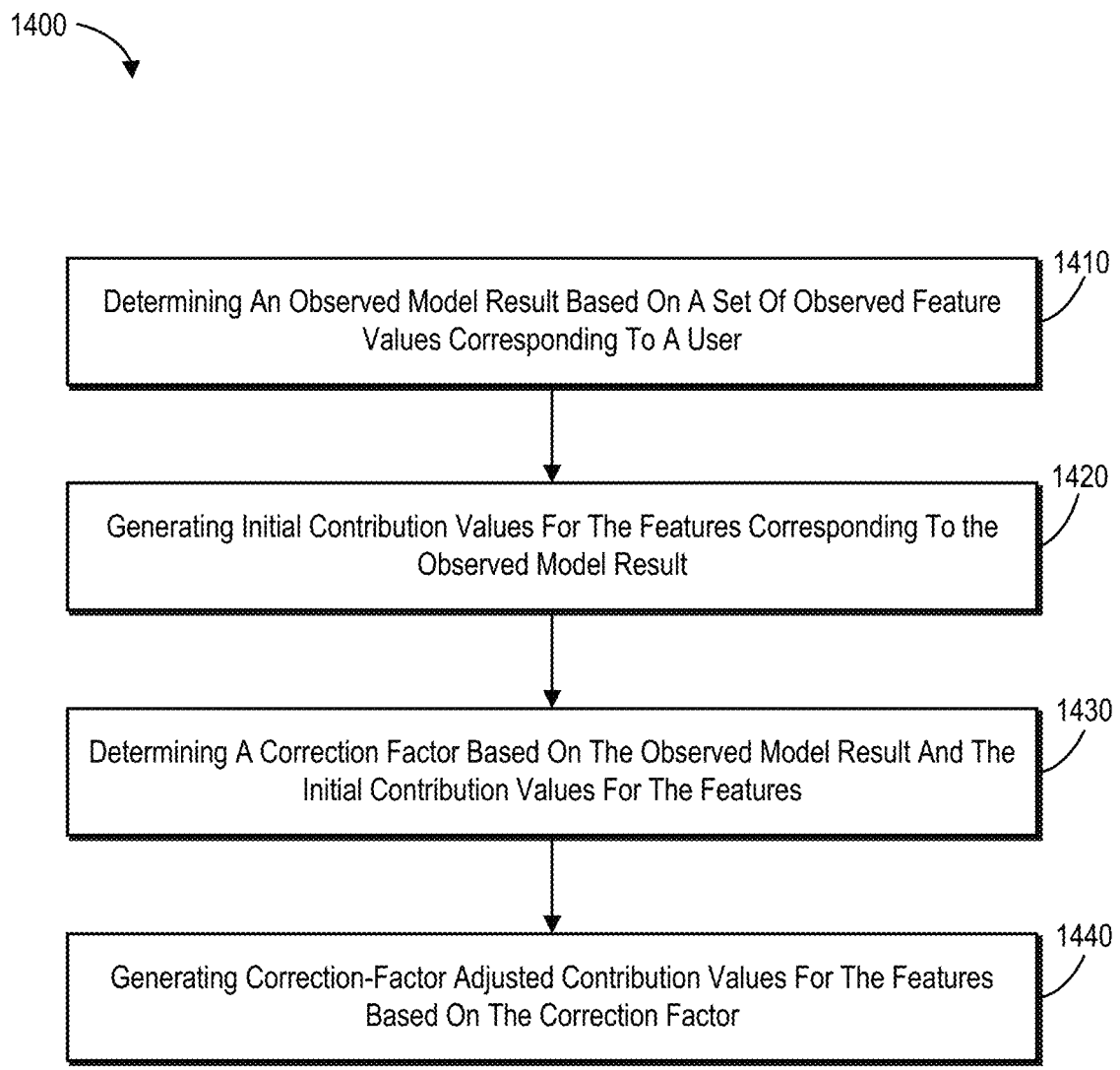
FIG. 14 illustrates a flowchart of a series of acts of generating correction-factor adjusted contribution values of observed features of a model in accordance with one or more embodiments.

As mentioned, FIG. 14 illustrates a flowchart of a series of acts 1400 of generating correction-factor adjusted contribution values of observed features of a model in accordance with one or more embodiments. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer-readable medium can comprise instructions that, when executed by one or more processors, cause a computing device to perform the acts of FIG. 14. In some embodiments, a system can perform the acts of FIG. 14.

In one or more embodiments, the series of acts 1400 is implemented on one or more computing devices, such as the server devices 102, 108 or client device 112 or the computing devices 1100, 1200, 1300. In addition, in some embodiments, the series of acts 1400 is implemented in a digital environment for utilizing machine-learning models to generate predictive results. For example, the series of acts 1400 is implemented on a computing device having memory that includes a machine-learning model, observed features values for features, and a historical feature dataset comprising historical feature values for the features.

The series of acts 1400 can include an act 1410 of determining an observed model result based on a set of observed feature values corresponding to a user. In some embodiments, the act 1410 can involve determining an observed model result by applying a machine-learning model to a set of observed feature values for a plurality of features corresponding to a user. In one or more embodiments, the act 1410 can include determining an observed model result based on applying the machine-learning model to the observed feature values. In various embodiments, the act 1410 can include utilizing a machine-learning model to generate a predictive result corresponding to a user. In some embodiments, the features include at least two of a continuous feature, a binary feature, or a categorical feature.

As shown, the series of acts 1400 also includes an act 1420 of generating initial contribution values for the features corresponding to the observed model result. In particular, the act 1420 can involve generating a plurality of initial contribution values for the plurality of features based on the observed model result and a plurality of combined target-feature-modified model results. In one or more embodiments, the act 1420 can include identifying a historical feature dataset including a plurality of historical feature sets, each historical feature set including historical feature values for the plurality of features. In some embodiments, the act 1420 can also include generating the combined historical features model result by applying the machine-learning model to each of the historical feature sets to determine a plurality of historical feature model results and combining the plurality of historical feature model results to generate the combined historical features model result.

In various embodiments, the act 1420 can also include generating a combined target-feature-modified model result of the plurality of combined target-feature-modified model results by generating a set of target-feature-modified observed features corresponding to the target feature by replacing a target feature value for the target feature with each historical feature value of the plurality of historical feature values that correspond to the target feature as well as utilizing the machine-learning model to determine the combined target-feature-modified model result corresponding to the target feature based on the generated set of target-feature-modified observed features corresponding to the target feature. In some embodiments, the act 1420 can include generating the combined target-feature-modified model result corresponding to the target feature by aggregating target-feature-modified model results corresponding to the plurality of historical feature values that correspond to the target feature and normalizing the aggregated target-feature-modified model results based on a number of the historical feature values corresponding to the target feature.

In some embodiments, the act 1420 can also include generating the plurality of initial contribution values for the plurality of features based on a difference between the observed model result and the combined target-feature-modified model results. Indeed, in various embodiments, the act 1420 can include generating initial contribution values of the plurality of features by comparing the observed model result to each of the plurality of combined target-feature-modified model results.

As shown in FIG. 14, the series of acts 1400 further includes an act 1430 of determining a correction factor based on the observed model result and the initial contribution values for the features. In particular, the act 1430 can include determining a correction factor based on the observed model result, the plurality of initial contribution values for the plurality of features, and a combined historical features model result.

In one or more embodiments, the act 1430 can include determining the correction factor based on the observed model result, the plurality of initial contribution values for the plurality of features, and the combined historical features model result such that the correction factor applied to the initial contribution values reflect a difference between the combined historical features model result and the observed model result. Indeed, in various embodiments, the act 1430 can include determining the correction factor by combining the observed model result with the initial contribution values and deducting the combined historical features model result.

In some embodiments, the act 1430 can also include generating the correction-factor adjusted contribution values by modifying each of the initial contribution values by a ratio between the correction factor and a number of features in the plurality of features. In one or more embodiments, the act 1430 can include generating the correction-factor adjusted contribution values for the plurality of features by normalizing (e.g., dividing) the correction factor by a number of the plurality of features and reducing the initial contribution values by the normalized correction factor. In various embodiments, the correction-factor adjusted contribution values include a correction-factor adjusted contribution value for each of the plurality of features.

As shown, the series of acts 1400 also includes an act 1440 of generating correction-factor adjusted contribution values for the features based on the correction factor. In particular, the act 1440 can include generating correction-factor adjusted contribution values for the plurality of features based on the initial contribution values for the plurality of features and the correction factor. In some embodiments, the act 1440 can include adding the observed model result with the initial contribution values for the features and subtracting the combined historical features model result.

The series of acts 1400 can also include the act of providing a visualization of one or more features of the plurality of features for display based on the correction-factor adjusted contribution values. In some embodiments, providing the visualization of one or more features of the plurality of features for display is based on the correction-factor adjusted contribution values. In some embodiments, the series of acts 1400 can also include the act of receiving a request for feature contributions corresponding to the predictive result. Further, the series of acts 1400 can include providing a visualization of one or more feature contributions of the predictive result for display based on the correction-factor adjusted feature contribution values in response to the request. In one or more embodiments, the visualization of the one or more feature contributions of the predictive result includes displaying correction-factor adjusted feature contribution values corresponding to the one or more feature contributions. In various embodiments, the visualization of the one or more feature contributions of the predictive result includes displaying a positive feature contribution and a negative feature contribution.

The series of acts 1400 can also include the acts of determining the plurality of combined target-feature-modified model results by generating additional sets of target-feature-modified observed features corresponding to an additional target feature of the plurality of features by replacing an additional target feature value for the additional target feature with additional historical feature values corresponding to the additional target feature and utilizing the machine-learning model to determine an additional combined target-feature-modified model result for the additional target feature based on the additional sets of target-feature-modified observed features. In additional embodiments, the above acts can include generating the initial contribution values of the plurality of features by determining an initial contribution value for the target feature by comparing the observed model result to the combined target-feature-modified model result and determining an additional initial contribution value for the additional target feature by comparing the observed model result to the additional combined target-feature-modified model result.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the feature contribution system 106 to efficiently determine local machine learning model feature contributions, as described herein.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some embodiments, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 15:
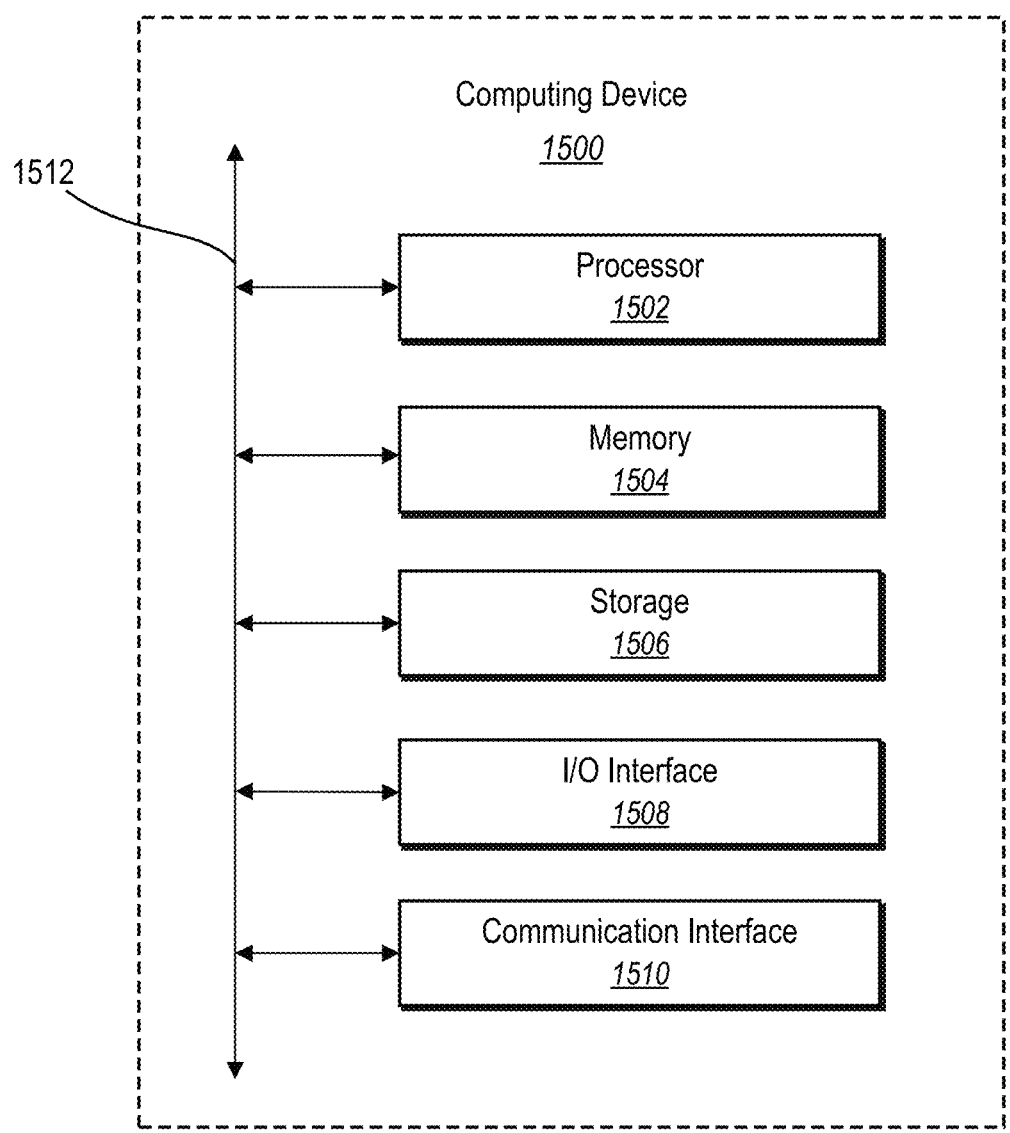
FIG. 15 illustrates a block diagram of an example computing device for implementing one or more embodiments of the present disclosure.

FIG. 15 illustrates a block diagram of an example computing device 1500 that may be configured to perform one or more of the processes described above. One will appreciate that one or more computing devices, such as the computing device 1500 may represent the computing devices described above (e.g., the server devices 102, 108 or client device 112 or the computing devices 1100, 1200, 1300). In one or more embodiments, the computing device 1500 may be a mobile device (e.g., a laptop, a tablet, a smartphone, a mobile telephone, a camera, a tracker, a watch, a wearable device, etc.). In some embodiments, the computing device 1500 may be a non-mobile device (e.g., a desktop computer, a server device, a web server, a file server, a social networking system, a program server, an application store, or a content provider). Further, the computing device 1500 may be a server device that includes cloud-based processing and storage capabilities.

As shown in FIG. 15, the computing device 1500 can include one or more processor(s) 1502, memory 1504, a storage device 1506, input/output ("I/O") interfaces 1508, and a communication interface 1510, which may be communicatively coupled by way of a communication infrastructure (e.g., bus 1512). While the computing device 1500 is shown in FIG. 15, the components illustrated in FIG. 15 are not intended to be limiting. Additional or alternative components may be used in other embodiments. Furthermore, in certain embodiments, the computing device 1500 includes fewer components than those shown in FIG. 15. Components of the computing device 1500 shown in FIG. 15 will now be described in additional detail.

In particular embodiments, the processor(s) 1502 includes hardware for executing instructions, such as those making up a computer program. As an example, and not by way of limitation, to execute instructions, the processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, the storage device 1506 can include a non-transitory storage medium described above. The storage device 1506 may include a hard disk drive (HDD), flash memory, a Universal Serial Bus (USB) drive or a combination these or other storage devices.

As shown, the computing device 1500 includes one or more I/O interfaces 1508, which are provided to allow a user to provide input to (e.g., user strokes), receive output from, and otherwise transfer data to and from the computing device 1500. These I/O interfaces 1508 may include a mouse, keypad or a keyboard, a touch screen, camera, optical scanner, network interface, modem, other known I/O devices or a combination of these I/O interfaces 1508. The touch screen may be activated with a stylus or a finger.

The I/O interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1508 are configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 provides one or more interfaces for communication (such as, for example, packet-based communication) between the computing device and one or more other computing devices or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can include hardware, software, or both that connects components of computing device 1500 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    train a black box machine-learning model by observing client device interactions across a computer network, the observed client device interactions indicating at least one of a propensity for a client device to return to a website, a selection of digital content by the client device, the client device being an anonymous visitor, or the client device being a bot;
    generate, utilizing the black box machine-learning model comprising tuned parameters organized into a plurality of layers to process observed feature vectors of a set of observed feature values, an observed model result from the set of observed feature values for a plurality of features corresponding to the observed client device interactions;
    generate, utilizing the tuned parameters organized into the plurality of layers of the black box machine-learning model, a plurality of combined target-feature modified model results;
    generate, based on the plurality of combined target-feature modified model results and the observed model result, a plurality of initial contribution values for the plurality of features;
    determine a correction factor based on the observed model result, the plurality of initial contribution values for the plurality of features, and a combined historical features model result;
    generate correction-factor adjusted contribution values for the plurality of features from the plurality of initial contribution values for the plurality of features and the correction factor; and
    provide, for display via a user interface of a user device, a black box machine-learning model interpretation visualization comprising the observed model result, the plurality of features, and the correction-factor adjusted contribution values indicating contribution of the plurality of features to the observed model result generated utilizing the tuned parameters organized into the plurality of layers of the black box machine-learning model.

2. The non-transitory computer-readable medium of claim 1, wherein the instructions, when executed by the at least one processor, cause the computing device to determine the correction factor based on the observed model result, the plurality of initial contribution values for the plurality of features, and the combined historical features model result such that the correction factor applied to the plurality of initial contribution values reflect a difference between the combined historical features model result and the observed model result.

3. The non-transitory computer-readable medium of claim 2, wherein the instructions, when executed by the at least one processor, cause the computing device to generate the correction-factor adjusted contribution values utilizing a linear operation; wherein the linear operation determines a ratio between the correction factor and a number of features in the plurality of features and modifies each of the plurality of initial contribution values based on the ratio between the correction factor and number of features in the plurality of features.

4. The non-transitory computer-readable medium of claim 1, wherein utilizing the black box machine-learning model comprises utilizing at least one of a deep neural network model architecture, a decision-tree-based ensemble machine learning model architecture, a support vector machine model architecture, or a gradient boosting machine learning model architecture.

5. The non-transitory computer-readable medium of claim 1, further comprising instructions that, when executed by the at least one processor, cause the computing device to train the black box machine-learning model by:
    generating, utilizing the black box machine-learning model, a predicted model result from a set of input features comprising at least one of binary features, continuous features, or categorical features by mapping the set of input features to the predicted model result; and generating the tuned parameters organized into the plurality of layers by modifying parameters of the black box machine-learning model based on the predicted model result.

6. The non-transitory computer-readable medium of claim 1, further comprising instructions that, when executed by the at least one processor, cause the computing device to train the black box machine-learning model by:
generating, utilizing the black box machine-learning model, predicted model results; and
training the black box machine-learning model by comparing the predicted model results with the observed client device interactions.

7. The non-transitory computer-readable medium of claim 1, wherein the instructions, when executed by the at least one processor, cause the computing device to generate the observed model result that comprises a score, the score indicating at least one of a probability of the client device to return to the website, a probability that the client device is not the anonymous visitor, or a probability that the client device is not a bot.

8. The non-transitory computer-readable medium of claim 1, wherein the instructions, when executed by the at least one processor, cause the computing device to generate the plurality of initial contribution values for the plurality of features based on a difference between the observed model result and the plurality of combined target-feature modified model results.

9. The non-transitory computer-readable medium of claim 1, further comprising instructions that, when executed by the at least one processor, cause the computing device to provide a visualization comprising positive contribution values and negative contribution values of one or more features of the plurality of features for display based on the correction-factor adjusted contribution values.

10. A system comprising:
one or more memory devices comprising a black box machine-learning model, a plurality of observed feature values for a plurality of features, and a historical feature dataset comprising a plurality of historical feature values for the plurality of features; and
one or more server devices that cause the system to:
train the black box machine-learning model by observing client device interactions across a computer network, the observed client device interactions indicating at least one of a propensity for a client device to return to a website, a selection of digital content by the client device, the client device being an anonymous visitor, or the client device being a bot;
generate, utilizing the black box machine-learning model comprising tuned parameters organized into a plurality of layers to process observed feature vectors of a set of observed feature values, an observed model result from the set of observed feature values for a plurality of features corresponding to the observed client device interactions;
determine, utilizing the tuned parameters organized into the plurality of layers of the black box machine-learning model, a plurality of combined target-feature-modified model results by:
generating sets of target-feature-modified observed features corresponding to a target feature of the plurality of features by replacing a target feature value for the target feature with historical feature values corresponding to the target feature; and
utilizing the tuned parameters of the black box machine-learning model to determine a combined target-feature-modified model result based on the sets of target-feature-modified observed features;
generate initial contribution values of the plurality of features by comparing the observed model result to the plurality of combined target-feature-modified model results;
determine a correction factor based on the observed model result, the initial contribution values, and a combined historical features model result; and
generate correction-factor adjusted contribution values for the plurality of features from the initial contribution values and the correction factor; and
provide, for display via a user interface of a user device, a black box machine-learning model interpretation visualization comprising the observed model result, the plurality of features, and the correction-factor adjusted contribution values indicating contribution of the plurality of features to the observed model result, generated utilizing the tuned parameters organized into the plurality of layers of the black box machine-learning model.

11. The system of claim 10, wherein the one or more server devices cause the system to determine the correction factor by combining the observed model result with the initial contribution values and deducting the combined historical features model result.

12. The system of claim 10, wherein the one or more server devices cause the system to generate the correction-factor adjusted contribution values for the plurality of features by:
normalizing the correction factor by a number of the plurality of features; and
reducing the initial contribution values by the normalized correction factor.

13. The system of claim 12, wherein the correction-factor adjusted contribution values comprise a correction-factor adjusted contribution value for each of the plurality of features.

14. The system of claim 10, wherein the one or more server devices cause the system to utilize the tuned parameters of the black box machine-learning model to determine a combined target-feature-modified model result, corresponding to the target feature of the plurality of features, of the plurality of combined target-feature-modified model results by:
determining a target-feature-modified observed feature result for each set of the sets of the target-feature-modified observed features corresponding to the target feature of the plurality of features;
aggregating the determined target-feature-modified observed results; and
normalizing the aggregated target-feature-modified observed results by a number of the historical feature values corresponding to the target feature.

15. The system of claim 10, wherein the one or more server devices further cause the system to provide, via the user interface of the user device, a visualization comprising an aggregate graph that indicates the one or more features of the plurality of features for display based on the correction-factor adjusted contribution values, a negative feature list comprising negative feature values and corresponding correction-factor adjusted contribution values, and a positive feature list comprising positive feature values and corresponding correction-factor adjusted contribution values.

16. The system of claim 10, wherein the one or more server devices cause the system to:

determine the plurality of combined target-feature-modified model results by:
  generating additional sets of target-feature-modified observed features corresponding to an additional target feature of the plurality of features by replacing an additional target feature value for the additional target feature with additional historical feature values corresponding to the additional target feature; and
  utilizing the tuned parameters of the black box machine-learning model to determine an additional combined target-feature-modified model result for the additional target feature based on the additional sets of target-feature-modified observed features; and
generate the initial contribution values of the plurality of features by:
  determining an initial contribution value for the target feature by comparing the observed model result to the combined target-feature-modified model result; and
  determining an additional initial contribution value for the additional target feature by comparing the observed model result to the additional combined target-feature-modified model result.

17. A computer implemented method comprising:
training a black box machine-learning model by observing client device interactions across a computer network, the observed client device interactions indicating at least one of a propensity for a client device to return to a website, a selection of digital content by the client device, the client device being an anonymous visitor, or the client device being a bot;
generating, utilizing the black box machine-learning model comprising tuned parameters organized into a plurality of layers to process observed feature vectors of a set of observed feature values, an observed model result from the set of observed feature values for a plurality of features corresponding to the observed client device interactions;
generating, utilizing the tuned parameters organized into the plurality of layers of the black box machine-learning model, a plurality of combined target-feature-modified model results;
generating, based on the plurality of combined target-feature-modified model results and the observed model result, a plurality of initial contribution values for the plurality of features;
determining a correction factor based on the observed model result, the plurality of initial contribution values for the plurality of features, and a combined historical features model result;
generating correction-factor adjusted contribution values for the plurality of features from the plurality of initial contribution values for the plurality of features and the correction factor; and
providing, for display via a user interface of a user device, a black box machine-learning model interpretation visualization comprising the observed model result, the plurality of features, and the correction-factor adjusted contribution values indicating contribution of the plurality of features to the observed model result generated utilizing the tuned parameters organized into the plurality of layers of the black box machine-learning model.

18. The computer implemented method of claim 17, wherein determining the correction factor based on the observed model result, the plurality of initial contribution values for the plurality of features, and the combined historical features model result such that the correction factor applied to the plurality of initial contribution values reflect a difference between the combined historical features model result and the observed model result.

19. The computer implemented method of claim 17, wherein generating the correction-factor adjusted contribution values utilizing a linear operation; wherein the linear operation determines a ratio between the correction factor and a number of features in the plurality of features and modifies each of the plurality of initial contribution values based on the ratio between the correction factor and number of features in the plurality of features.

20. The computer implemented method of claim 17, wherein providing, for display via the user interface of the user device, the black box machine-learning model interpretation visualization further comprises providing:
  a first subset of features of the plurality of features and a corresponding first subset of correction-factor adjusted contribution values that indicates at least one of the propensity for the client device to return to the website, the selection of digital content by the client device, the client device being the anonymous visitor, or the client device being the bot; and
  a second subset of features of the plurality of features and a corresponding second subset of correction-factor adjusted contribution values that indicates at least one of the propensity for the client device to return to the website, the selection of digital content by the client device, the client device being the anonymous visitor, or the client device being the bot.

* * * * *